US011487482B2

(12) United States Patent
Kurokawa et al.

(10) Patent No.: US 11,487,482 B2
(45) Date of Patent: Nov. 1, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Masaki Kurokawa, Kanagawa (JP); Nobuyuki Obayashi, Kanagawa (JP); Kenji Nomura, Kanagawa (JP); Yujiro Kobayashi, Kanagawa (JP); Mamoru Sasamae, Kanagawa (JP); Masaaki Takei, Kanagawa (JP); Kenji Yufu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 384 days.

(21) Appl. No.: 16/566,904

(22) Filed: Sep. 11, 2019

(65) Prior Publication Data
US 2020/0099637 A1 Mar. 26, 2020

(30) Foreign Application Priority Data

Sep. 20, 2018 (JP) .............................. JP2018-175823

(51) Int. Cl.
*G06F 3/12* (2006.01)
*G06F 21/60* (2013.01)
(Continued)

(52) U.S. Cl.
CPC .......... *G06F 3/1222* (2013.01); *G06F 3/1203* (2013.01); *G06F 3/1238* (2013.01);
(Continued)

(58) Field of Classification Search
None
See application file for complete search history.

(56) References Cited

U.S. PATENT DOCUMENTS 9,621,492 B2   4/2017  Park et al.
10,652,178 B2  5/2020  Takishima et al.
(Continued)

FOREIGN PATENT DOCUMENTS

JP  2010218154  9/2010
JP  2014225268  12/2014
(Continued)

OTHER PUBLICATIONS

"Office Action of Japan Counterpart Application" with English translation thereof, dated Jun. 28, 2022, p. 1-p. 5.

*Primary Examiner* — Lennin R RodriguezGonzalez
(74) *Attorney, Agent, or Firm* — JCIPRNET

(57) ABSTRACT

An information processing apparatus includes a unit that receives, on a group chat, an execution command to execute specific processing that requires entry of secret information from a first user belonging to the group chat including two or more users; an acquisition unit that acquires the secret information from a second user belonging to the group chat without letting a third user belonging to the group chat and different from the second user know the secret information; and a controller that performs control so that the specific processing based on the execution command is executed by using the secret information.

18 Claims, 16 Drawing Sheets

(51) Int. Cl.
*H04N 1/00* (2006.01)
*H04L 51/04* (2022.01)
*H04L 9/40* (2022.01)

(52) U.S. Cl.
CPC ......... *G06F 21/606* (2013.01); *H04N 1/0087* (2013.01); *H04N 1/00875* (2013.01); *H04L 51/04* (2013.01); *H04L 63/10* (2013.01); *H04L 63/18* (2013.01); *H04N 2201/0087* (2013.01)

(56) References Cited

U.S. PATENT DOCUMENTS

| | | | |
|---|---|---|---|
| 10,917,369 | B2 | 2/2021 | Takishima et al. |
| 2013/0166275 | A1 | 6/2013 | Yang et al. |
| 2015/0172505 | A1* | 6/2015 | Park .................. H04N 1/00307 |
| | | | 358/1.15 |
| 2016/0043975 | A1 | 2/2016 | Park et al. |
| 2016/0134568 | A1* | 5/2016 | Woo ..................... H04L 51/046 |
| | | | 709/206 |
| 2019/0369924 | A1* | 12/2019 | Oka ........................ H04L 51/02 |

FOREIGN PATENT DOCUMENTS

| | | |
|---|---|---|
| JP | 2015-144027 | 8/2015 |
| JP | 2015179519 | 10/2015 |
| JP | 2018128843 | 8/2018 |

* cited by examiner

| GROUP 001 | | |
|---|---|---|
| FILE NAME | PASSWORD (PW) | REGISTRANT |
| CONFIDENTIAL DOCUMENT A.pdf | pwda | YORKSHIRE TERRIER |
| CONFIDENTIAL DOCUMENT B.pdf | x-admin | DACHSHUND |
| CONFIDENTIAL DOCUMENT C.pdf | (UNKNOWN) | POODLE |
| MARKET RESEARCH RESULT REPORT.pdf | (NONE) | DACHSHUND |
| ... | ... | |

| GROUP 001 | | | |
|---|---|---|---|
| FILE NAME | PASSWORD | REGISTRANT | PRINT AUTHORIZED PERSON |
| CONFIDENTIAL DOCUMENT A.pdf | pwda | YORKSHIRE TERRIER | |
| CONFIDENTIAL DOCUMENT B.pdf | x-admin | DACHSHUND | YORKSHIRE TERRIER |
| CONFIDENTIAL DOCUMENT C.pdf | (UNKNOWN) | POODLE | |
| MARKET RESEARCH RESULT REPORT.pdf | (NONE) | DACHSHUND | |
| ... | ... | | |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-175823 filed Sep. 20, 2018.

BACKGROUND

(i) Technical Field

The present disclosure relates to an information processing apparatus and a non-transitory computer readable medium.

(ii) Related Art

There are software robots (hereinafter referred to as "chatbots") that receive data included in a user's post on a chat and perform specific processing on the data.

The information offering system disclosed in Japanese Unexamined Patent Application Publication No. 2015-179519 allows a user to add, as a friend, an interpretation software robot that is a virtual friend realized by an artificial intelligence software program on an instant messaging application executed on a user terminal. When the user enters and sends a message in a first language in a talk session with the interpretation software robot, the information offering system generates a message translated in a second language and offers the generated message to the user and a communication partner together with the message written in the first language or instead of the message written in the first language.

In a case where contents of a message analyzed by an analyzing unit are a control command for a predetermined electric apparatus, the control server disclosed in Japanese Unexamined Patent Application Publication No. 2015-144027 writes a message including an expression that reminds a user that a subject of the message is the electric apparatus on an electric message board in response to the control command.

In the method disclosed in Japanese Unexamined Patent Application Publication No. 2014-225268 that is an information offering method using an instant messaging application, a message sent to a software robot by a user through a messaging application on a user terminal is received, a response is retrieved from a database by using the message as a query, and the response is sent to the user through the messaging application on the user terminal.

SUMMARY

Assume that a chatbot that performs control for executing specific processing operates on a group chat including two or more users. In a case where execution of the specific processing requires entry of secret information, the chatbot may be notified of the secret information, for example, by posting the secret information on the group chat. However, according to this method, an unspecified user belonging to the group chat can know the secret information.

Aspects of non-limiting embodiments of the present disclosure relate to providing a method for controlling execution of specific processing without letting an unspecified user among users participating in a group chat know secret information in a case where one of the users participating in the group chat instructs a chatbot participating in the group chat to execute the specific processing that needs entry of the secret information.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a unit that receives, on a group chat, an execution command to execute specific processing that requires entry of secret information from a first user belonging to the group chat including two or more users; an acquisition unit that acquires the secret information from a second user belonging to the group chat without letting a third user belonging to the group chat and different from the second user know the secret information; and a controller that performs control so that the specific processing based on the execution command is executed by using the secret information.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure is described with reference to the drawings by taking a chatbot that offers a print service in accordance with a message from a user as an example of a chatbot.

Exemplary Embodiment

Figure 1:
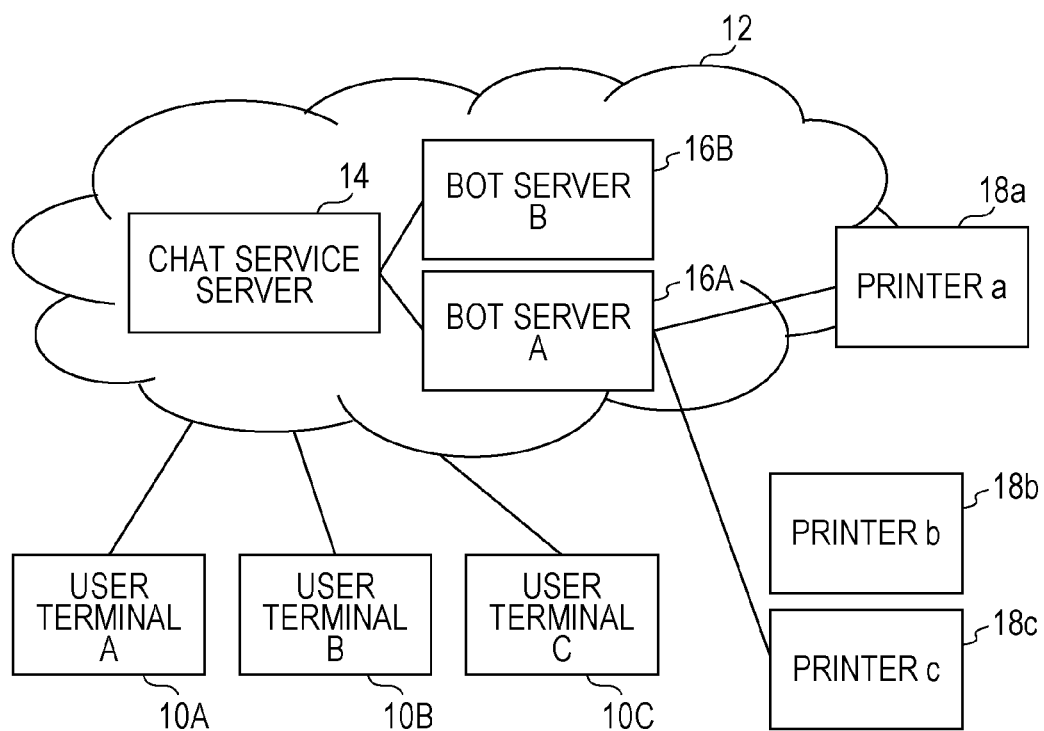
FIG. 1 is a system configuration diagram according to an exemplary embodiment.

FIG. 1 illustrates an overall configuration of a message service system according to an exemplary embodiment. The message service system includes user terminals A (10A) to C (10C), a chat service server 14, bot servers A (16A) and B (16B), and printers a (18a) to c (18c).

The user terminals A (10A) to C (10C) are terminals used by users of a message service and information terminals such as smartphones, tablet terminals, and personal computers (PCs). Although three user terminals, i.e., the user terminal A (10A), the user terminal B (10B), and the user terminal C (10C) are illustrated in FIG. 1, the number of user terminals is not limited. The users access the chat service server 14 on a cloud 12 by operating the user terminals A (10A) to C (10C) and exchange a post such as a message with other users or a chatbot. In the following description, it is assumed that a user A operates the user terminal A, a user B operates the user terminal B, and a user C operates the user terminal C. The user terminals A (10A) to C (10C) and the chat service server 14 are connected so as to be capable of transmitting and receiving data over a wired or wireless communication network. The communication network is, for example, a public line such as the Internet but may be a dedicated line.

The chat service server 14 is a cloud server on the cloud 12 and is a server that offers a chat service. The chat service server 14 is constituted by one or more server computers. The chat service server 14 performs processing concerning exchange of a message or the like in general such as processing for transmitting and receiving a message or the like to and from the user terminals A (10A) to C (10C) and processing for displaying a display screen for message transmission and reception. The chat service server 14 can not only process exchange of a message or the like between two members, but also create a group made up of three or more members and process exchange of a message or the like in the group. Hereinafter, exchange of a message or the like between two members and a place of the exchange are referred to as a one-to-one chat or a peer-to-peer chat. Furthermore, exchange of a message or the like in a group made up of three or more members and a place of the exchange are referred to as a group chat. The chat service server 14 holds, for each group chat, a list of identifiers (e.g., user IDs) of members belonging to the group chat. Furthermore, the chat service server 14 processes exchange of a message or the like with chatbots offered by the bot servers 16A and 16B in cooperation with the bot server A (16A) and the bot server B (16B). In the present exemplary embodiment, a chatbot is handled as one of "members" who exchange a message or the like on a chat. That is, the members include both a user associated with an actual person and a chatbot. Exchange of a message or the like between a user and a chatbot include exchange of a message or the like between a single user and a chatbot and exchange of a message or the like among plural users and a chatbot. That is, a chatbot sometimes participates in a one-to-one chat with a user and sometimes participates in a group chat. A chatbot participates in a chat, for example, in response to invitation from a user participating in the chat.

The concept of a message or the like exchanged between members on a chat encompasses an image representing posted content such as a "stamp", a uniform resource locator (URL), and the like in addition to a message expressed as a character string. Such a message or the like is sometimes referred to as a "post" on a chat. The "post" in this case means information posted on a chat. Furthermore, a chat member's act of entering such a message or the like on a chat is also referred to as "post". The "post" in this case is an act. Examples of the "posting act" on a chat include an act of writing a text message on the chat, an act of sending a stamp, and an act of pasting a URL.

A software robot program for a chatbot that exchanges a message with a user is installed in the bot server A (16A) and the bot server B (16B), and the bot server A (16A) and the bot server B (16B) execute the program. The bot server A (16A) and the bot server B (16B) may be operated by a messenger service account of a company, a shop, or the like allocated for advertisement or commercial use.

The bot server A (16A) and the bot server B (16B) cooperate with the chat service server 14 through a specific application programming interface (API), exchanges a message with a user, and returns a message automatically in response to a message from the user. The specific API is an API for using the chat service server 14. The format of the API is not limited. For example, the API is an API of a Javascript (Registered Trademark) Object Notation (JSON) format, and JSON data of a specified format is sent to a specific URL of the chat service server 14 by using POST or GET, and a result is returned as JSON-format data.

In a case where a message from a user includes an operation command, the bot server A (16A) and the bot server B (16B) execute specific service content in accordance with the operation command. In the present exemplary embodiment, in a case where a message from a user includes a print command, the bot server A (16A) functions as a "print bot" that performs print processing by causing the printer a (18a), the printer b (18b), or the printer c (18c) to operate in accordance with this print command. Meanwhile, the bot server 16B can offer any service in accordance with an operation command from a user. Although two bot server A (16A) and bot server B (18B) are illustrated in FIG. 1, the number of bot servers is not limited. Plural chatbots may be constituted by a single bot server or a single chatbot may be constituted by plural bot servers.

The bot server A serving as a chatbot (or a print bot) executes print processing by driving the printer a, b, or c in accordance with setting information concerning operation of a software robot program that is registered in advance for each user.

The printers a (18a) to c (18c) execute print processing in response to a command from the bot server A.

Figure 2:
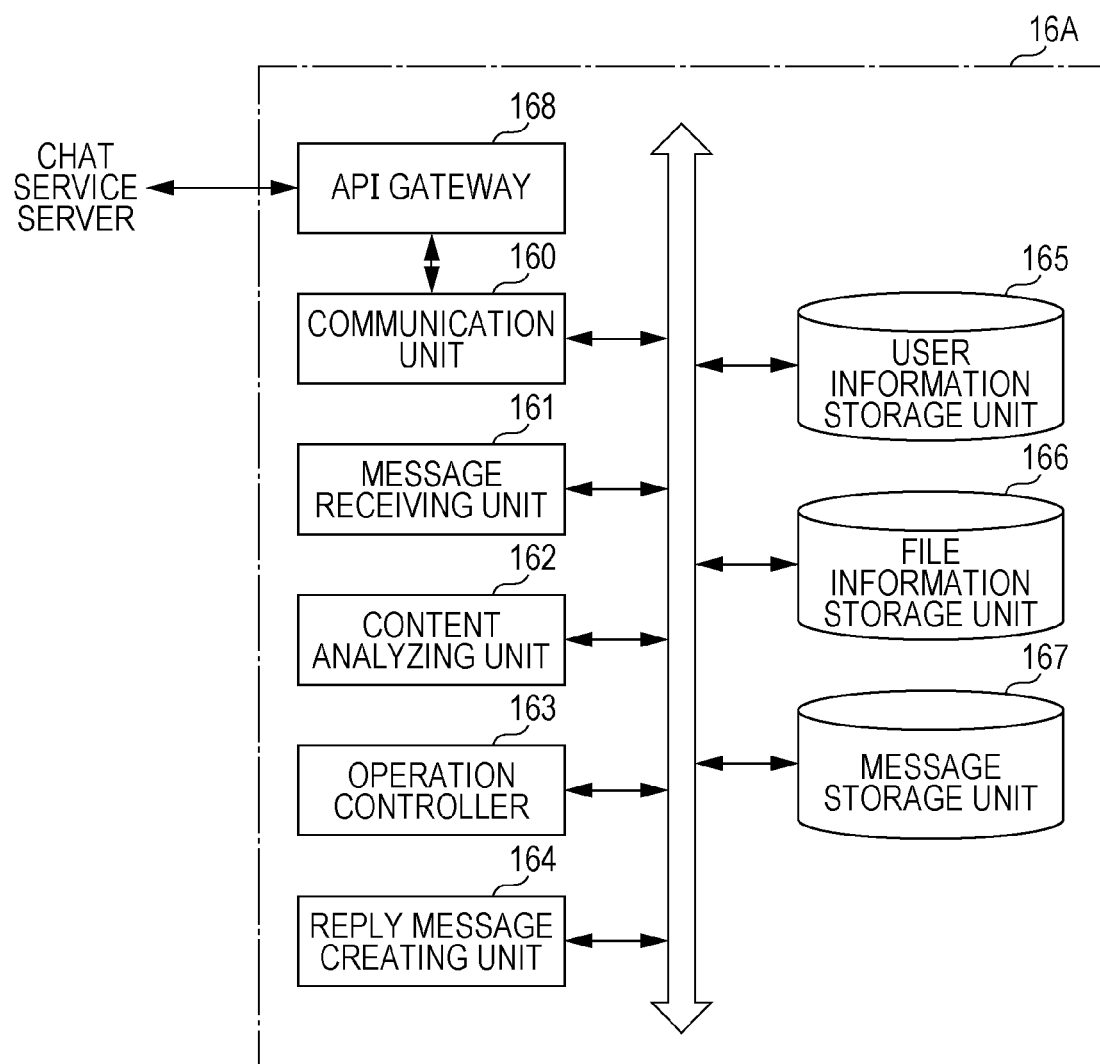
FIG. 2 is a functional block diagram according to the exemplary embodiment.

FIG. 2 is a functional block diagram of the bot server A (16A). The bot server A includes, as functional blocks, a communication unit 160, a message receiving unit 161, a content analyzing unit 162, an operation controller 163, a reply message creating unit 164, a user information storage unit 165, a file information storage unit 166, a message storage unit 167, and an API gateway 168.

The communication unit 160 communicates with the chat service server 14 and the printers a to c. The communication unit 160 exchanges a message by communicating with the chat service server 14 through the API gateway 168. The communication unit 160 supplies, to the message receiving unit 161, a post received from the chat service server 14 through the API gateway 168, i.e., a post from the user terminals A to C. The communication unit 160 sends, to the chat service server 14 (i.e., to the user terminals A to C), a reply created by the reply message creating unit 164 through the API gateway 168. Furthermore, the communication unit 160 gives a print command to the printers a to c so as to drive the printers a to c in accordance with a command from the operation controller 163.

The message receiving unit 161 receives information on a post (e.g., a message) from the communication unit 160 and supplies the information to the content analyzing unit 162. Examples of the post information posted on a member on a chat include a print command and a reply to a question from a chatbot. The message receiving unit 161 causes received posts (e.g., messages) to be sequentially stored in the message storage unit 167.

The content analyzing unit 162 analyzes contents of a message expressed as at least a character string among the received posts and supplies the analyzed contents to the operation controller 163. Specifically, the content analyzing unit 162 recognizes a user identifier (user ID) included in the received message and executes parsing by extracting a text part included in the message. The parsing method is not limited. For example, an entered message is broken into morphemes, and then a noun, an adjective, a verb, and an interrogative pronoun are extracted as keywords. In a case where the text part of the message includes an operation command, the content analyzing unit 162 analyzes contents of the operation command and supplies the analyzed contents to the operation controller 163. Examples of an operation command in the present exemplary embodiment include a print command for the printers a to c, a command to start or end a conference mode (details thereof will be described later), a command indicating that printing is unnecessary, and a command as a reply to a question of a chatbot. In a case where the received post is a stamp, the content analyzing unit 162 acquires meaning information associated with the stamp. Each stamp is given meaning represented by the stamp, and a computer for chat processing can acquire meaning of each stamp from the stamp itself or from the chat service server.

In a case where a print command from a user is recognized on the basis of an analysis result obtained by the content analyzing unit 162, the operation controller 163 gives the print command to the printers a to c through the communication unit 160. The operation controller 163 performs processing for dealing with a case where a document file (hereinafter simply referred to as a "file") that is protected as a file that cannot be printed is designated as a target to be printed in cooperation with the message receiving unit 161, the content analyzing unit 162, and the reply message creating unit 164 (details will be described later).

The reply message creating unit 164 creates a reply message in accordance with the analysis result obtained by the content analyzing unit 162 and a command from the operation controller 163 and sends the reply message to the chat service server 14 through the communication unit 160.

The user information storage unit 165 stores therein, as a table, information on users using the chat service server 14, especially information on users using the chatbot realized by the bot server A. The chatbot is given a specific account on a chat service realized by the chat service server 14, and use of the chatbot is determined when a user performs a certain operation (e.g., an operation that means "friend" registration) while designating this account. Examples of the information on the users stored in the user information storage unit 165 include user IDs and information on registered printers of the users. Furthermore, information on an authority of each user may be stored in the user information storage unit 165.

The file information storage unit 166 stores therein information on a document file posted on a chat by a user. Examples of the information stored in the file information storage unit 166 include a password that cancels a protected state of a file so that the file becomes printable.

The message storage unit 167 stores therein, as a history, messages from users received by the message receiving unit 161.

Figure 3:
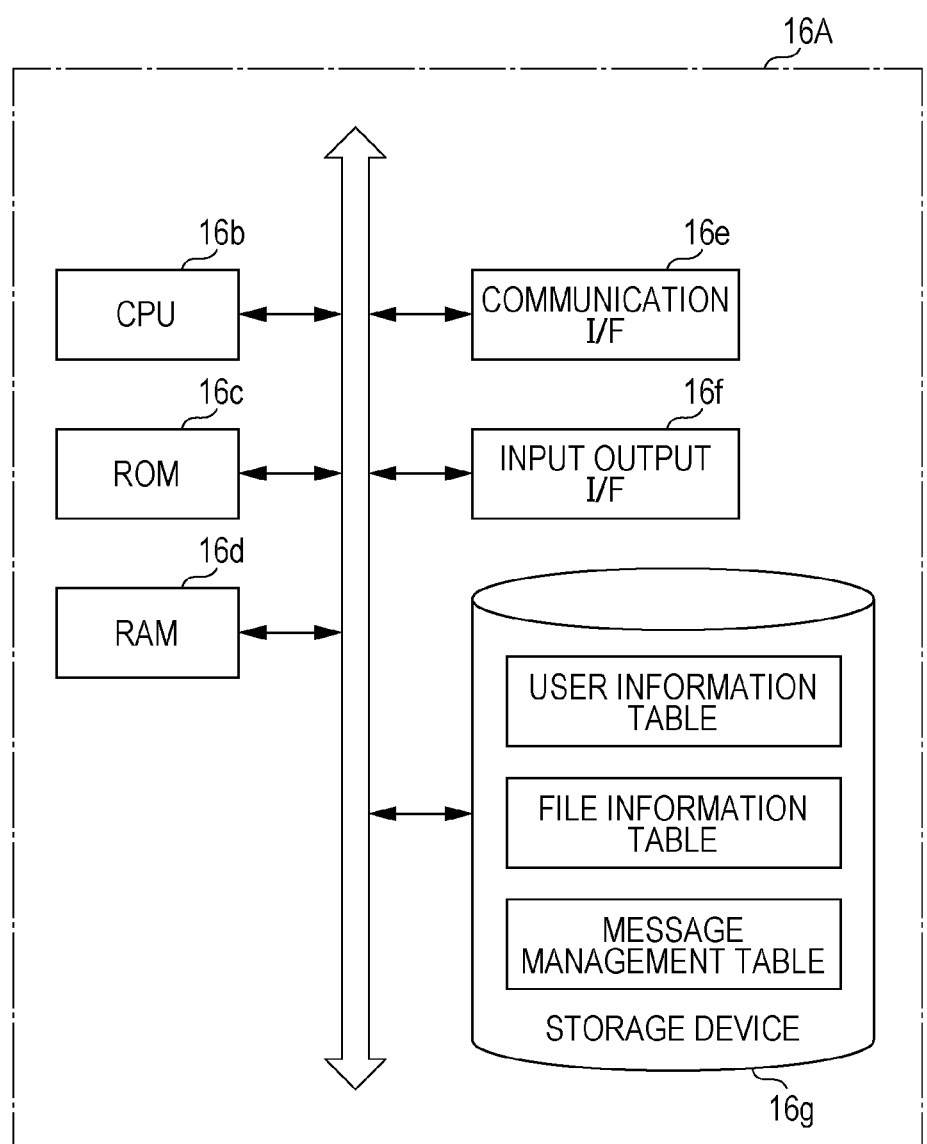
FIG. 3 is a configuration block diagram according to the exemplary embodiment.

FIG. 3 is a block diagram illustrating a configuration of the bot server A. The bot server A is constituted by one or more server computers and includes one or more CPUs 16*b*, a ROM 16*c*, a RAM 16*d*, a communication interface (I/F) 16*e*, an input output I/F 16*f*, and a storage device 16*g*.

One or more CPUs 16*b* read out a bot app stored in the ROM 16*c* or the storage device 16*g* and realizes a function of a chatbot by using the RAM 16*d* as a working memory. That is, the CPUs 16*b* automatically respond to a message from a user and drive the printers a to c in accordance with an operation command in a case where the message from the user includes the operation command. The CPUs 16*b* realize the message receiving unit 161, the content analyzing unit 162, the operation controller 163, the reply message creating unit 164, and the API gateway 168 in FIG. 2 by executing the bot app.

The communication I/F 16*e* exchanges a message with the chat service server 14 and supplies a print command to the printers a to c.

The input output I/F transmits and receives data to and from an input device such as a keyboard or a mouse and an output device such as a display device.

The storage device 16*g* is constituted by a non-volatile memory such as a hard disk drive (HDD) or a solid state drive (SSD) and stores therein a user information table, a file information table, and a message management table in addition to the bot app. The storage device 16*g* realizes the user information storage unit 165, the file information storage unit 166, and the message storage unit 167 in FIG. 2.

In the present exemplary embodiment, a software robot program for realizing a chatbot is executed by a CPU, but part of the chatbot may be realized not by processing performed by execution of a program but by hardware processing. The hardware processing may be performed, for example, by using a circuit such as an ASIC or a field programmable gate array (FPGA).

Printing of Password-Protected File

Depending on a file format of a file (also called a document), protection for making the file unprintable can be set, and the protection can be cancelled by entry of predetermined cancelling information such as a password. For example, at least two kinds of passwords called a viewing password (user password) and a master password (owner password) are prepared for a file having a format such as a portable document format (PDF) or an XDW format created by DocuWorks (Registered Trademark). In a case where a viewing password is set for a file having such a file format, the file is not opened unless the password is entered. As for a file for which a master password has been set, the master password need be entered in order to use functions such as printing, edit, copy and paste, and text reading. For example, in a case where a master password is set for a PDF file, the PDF file is protected so that the PDF file cannot be printed unless the password is entered. Hereinafter, setting of a password for protection that makes a file unprintable is referred to as PW protection, and a file for which such a password has been set is referred to as a PW-protected file (PW is an abbreviation of a password).

In a case where a file for which a user gives a print command on a group chat is a PW-protected file, the chatbot cannot print the file unless the protected state of the file is cancelled. Although the chatbot need get a password for cancelling the protection from the user, a message including the password is displayed on the group chat in a case where the password is posted on the group chat. This leads to a risk of letting other users participating in the group chat know the password.

In view of this, in the present exemplary embodiment, the chatbot inquires, not on a group chat but on a one-to-one chat, a password needed to print a PW-protected file for which a print command has been given on the group chat.

The following describes some methods of password inquiring processing performed by the chatbot.

Method of Inquiring Password from Person Who has Given Print Command

Figure 4:
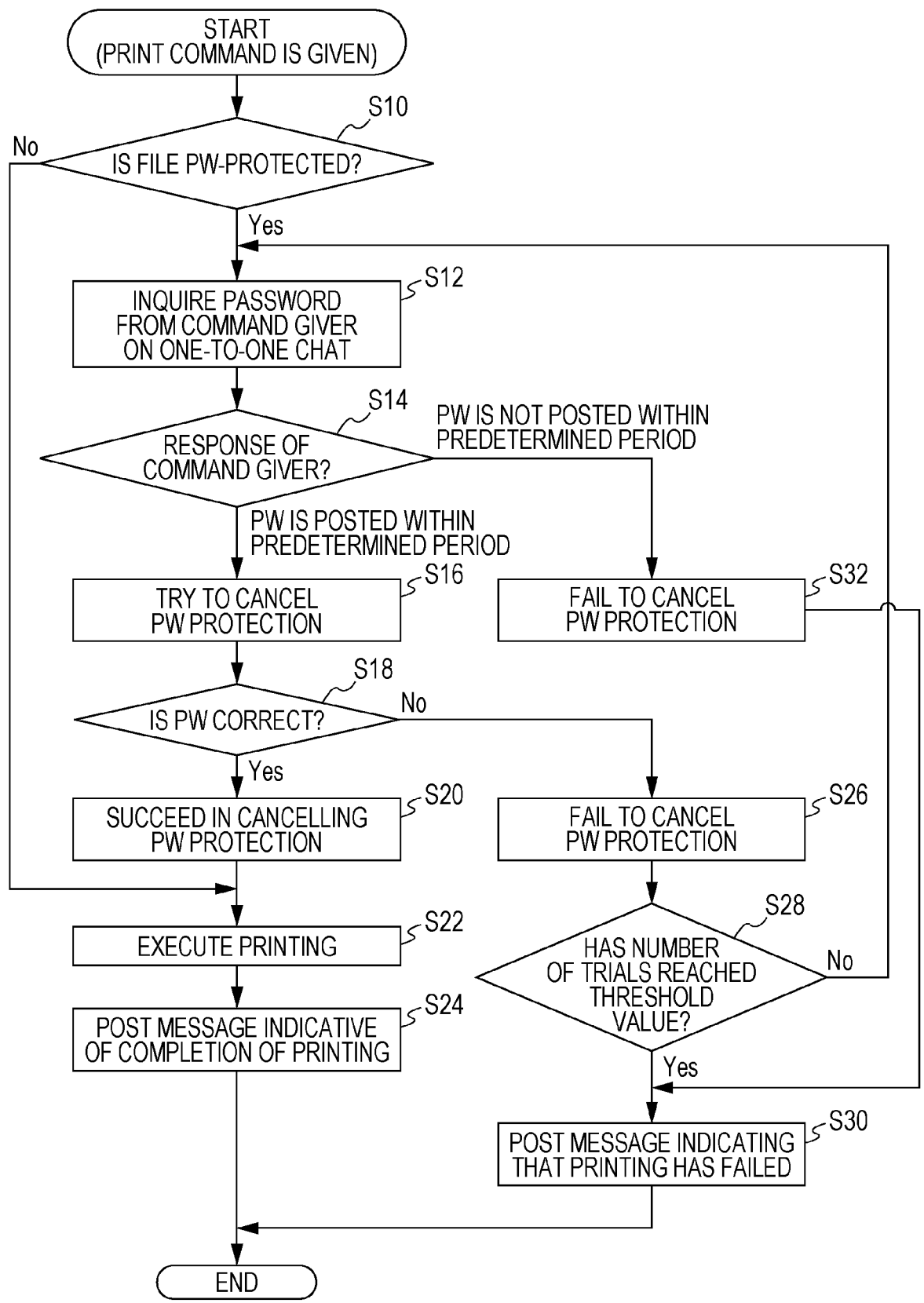
FIG. 4 illustrates a processing procedure of a chatbot in a case where a print command is posted on a group chat.

The following describes an example in which the chatbot inquires a password from a person (hereinafter referred to as a command giver) who has given a command to print a PW-protected file. In this example, the chatbot executes a procedure illustrated in FIG. 4. The procedure of FIG. 4 is executed in a case where any one of users posts a print command on a group chat.

In this procedure, first, the chatbot (the operation controller 163) determines whether or not a file designated as a print target in the print command is a PW-protected file (S10). In a case where a result of this determination is No, the file to be printed is printable, and therefore the chatbot performs processing for causing a printer to print the file (S22). The output destination printer is designated, for example, by the command giver (the file is printed by a default printer in a case where no printer is designated by the command giver). When the printing is completed, a message or the like indicative of completion of the printing is posted on the group chat (S24).

In a case where the result of the determination in S10 is Yes, the chatbot (the operation controller 163 and the reply message creating unit 164 controlled by the operation controller 163) posts a message or the like inquiring a password of the file not on the group chat but on a one-to-one chat with the command giver (S12). Then, the chatbot waits for a reply from the command giver to the post for a predetermined period (S14).

In a case where the command giver posts a reply on the one-to-one chat within the predetermined period, the chatbot regards a character string included in the post as a password and tries to cancel PW protection of the file to be printed by using the password (S16). In a case where the password is correct (a result of the determination in S18 is Yes), the chatbot succeeds in cancelling PW protection (S20). In this case, the chatbot causes a printer to print the file whose PW protection has been cancelled (S22). When the printing is completed, the chatbot posts a message or the like indicative of completion of the printing on the group chat (S24).

In a case where the result of the determination in S18 is No, i.e., in a case where the password is not correct, the chatbot fails to cancel PW protection (S26). In this case, the chatbot determines whether or not the number of trials (S16) of cancellation of PW protection has reached a predetermined threshold value (S28). In a case where the number of trials has not reached the predetermined threshold value, S12 is performed again in which the chatbot inquires a password of the file again on the one-to-one chat. In a case where it is determined in S28 that the number of trials of cancellation of PW protection has reached the predetermined threshold value, the chatbot gives a post indicative of failure to print the file for which the print command has been given on the group chat or on the one-to-one chat (or both on the group chat and on the one-to-one chat) (S30). In a case where it is determined in S14 that the command giver does not post a password within the predetermined period, the chatbot assumes that cancellation of PW protection has failed and then gives a post indicative of failure to print the file for which the print command has been given on the group chat or on the one-to-one chat (or both on the group chat and on the one-to-one chat) (S30).

Figure 5:
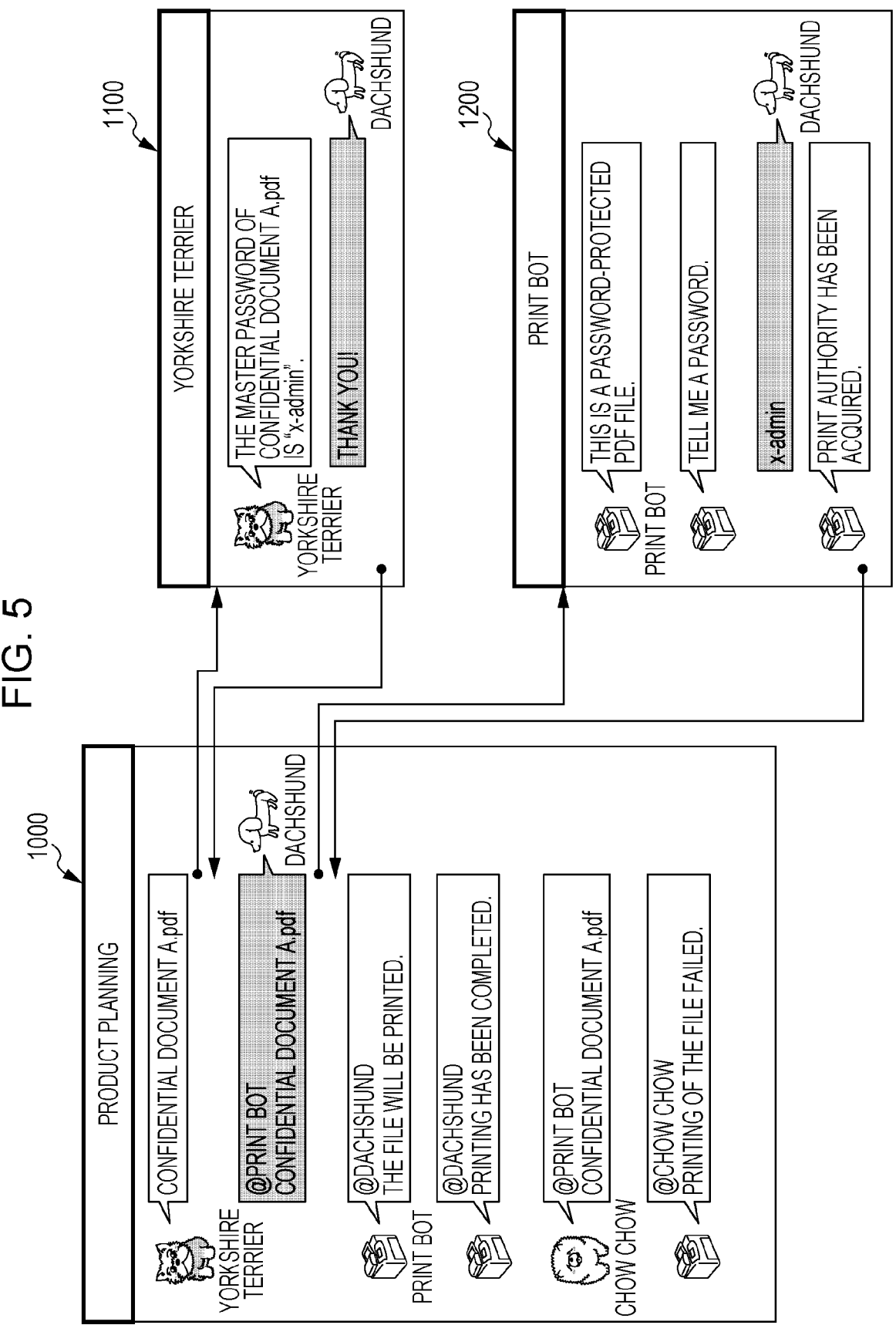
FIG. 5 illustrates an example of a screen of a chat corresponding to the procedure of FIG. 4.

FIG. 5 illustrates an example of a dialogue on a chat corresponding to the processing of FIG. 4. FIG. 5 illustrates a screen 1000 of a group chat and screens 1100 and 1200 of two one-to-one chats. These screens 1000, 1100, and 1200 are displayed on a terminal of a user having a user name "dachshund".

In the example of FIG. 5, first, a user "Yorkshire terrier" posts a file "confidential document A.pdf" on the group chat (the screen 1000). The "confidential document A.pdf" is a PW-protected file and is unprintable unless a password is presented. The "Yorkshire terrier" gives a post indicating that a password (a master password) for printing the "confidential document A.pdf" is "x-admin" on the one-to-one chat (the screen 1100) with the "dachshund" so that the "dachshund" participating in the group chat can print the file. In this way, the "dachshund" obtains the password.

Next, the "dachshund" posts a command for causing the chatbot to print the "confidential document A.pdf" on the group chat (the screen 1000). In this example, the chatbot is participating in the group chat by using a user name "Print Bot". In this example, the post of the print command for the chatbot is given in a form including a mention ("@Print Bot") to the chatbot and a file name of the file to be printed. The mention is a character string indicative of a destination of a post on a group chat and is constituted by "@" and a user name following "@".

Upon receipt of this print command, the chatbot gives a post inquiring a password on the one-to-one chat (the screen 1200) with the "dachshund" in order to acquire the password for printing since the "confidential document A.pdf" is a PW-protected file. In the example illustrated in FIG. 5, the chatbot ("Print Bot") posts a message "This is a password-protected PDF file." indicative of a reason of a subsequent inquiry about a password and then posts a message "Tell me a password.". In response to this, the "dachshund" posts the password "x-admin" on the one-to-one chat. The chatbot tries to cancel PW protection of the file "confidential document A.pdf" by using the character string "x-admin" included in the post. In the example illustrated in FIG. 5, the chatbot succeeds in cancelling PW protection and therefore posts a message "Print authority has been acquired." on the one-to-one chat.

Since the chatbot has succeeded in cancelling PW protection of the file to be printed, the chatbot gives a post for the command giver "dachshund" indicating that printing will be performed on the group chat (the screen 1000). When the printing is completed, the chatbot gives a post for the "dachshund" indicative of completion of the printing.

Next, another user "chow chow" posts a print command for causing the chatbot to print the "confidential document A.pdf" on the group chat. The chatbot inquires a password for printing on a one-to-one chat (illustration of an example of a screen is omitted) with the "chow chow", but the "chow chow", who has not been told a password from the "Yorkshire terrier", cannot answer the password. Therefore, after elapsed of a predetermined period, the chatbot posts a message "Printing of the file failed." for the "chow chow" on the group chat.

Method of Asking for Registration of Password when File is Registered

According to the method described with reference to FIGS. 4 and 5, a file cannot be printed unless a user who has given a print command acquires a password for cancelling PW protection of the file from a person who knows the password (typically a creator (owner) of the file).

In a case where a creator of a PW-protected file posts the file on a group chat and wants a participant of the group chat to print the file, one method is to tell the participant a password (for example, on a one-to-one chat). However, according to this method, the participant can give the acquired PW-protected file and password to a third party that is not related to the group chat, and therefore in this case, the third party can freely print the PW-protected file. Furthermore, in a case where the password is one (e.g., a master password of a PDF) that gives an authority to use functions such as edit and copy and paste other than printing, the participant and the third party are undesirably permitted to use the file in various ways that are not intended by the creator.

In view of this, the following describes a method in which a person who has posted a PW-protected file permits a participant of a group chat to print the PW-protected file by using a chatbot without telling the participant a password.

According to this method, when a user registers a PW-protected file in a group chat, the chatbot inquires a password from the user (referred to as a registrant) and holds the password thus obtained in association with the file. This inquiry is made not on the group chat but on a one-to-one chat between the chatbot and the registrant. In a case where a participant of the group chat gives a print command to print the file, the chatbot performs processing for printing the file by using the held password.

Figure 6:
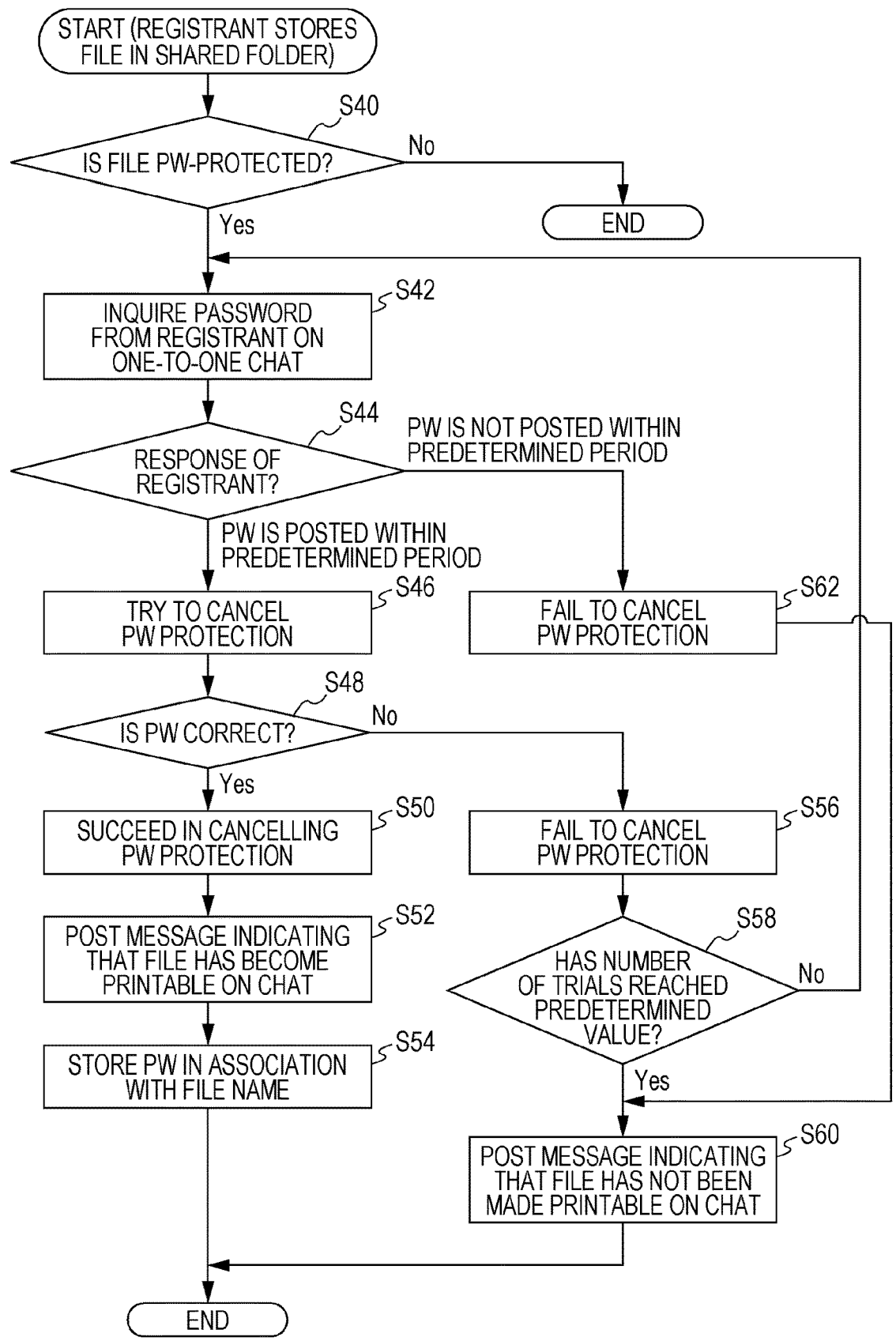
FIG. 6 illustrates a processing procedure of the chatbot in a case where an operation of registering a file in a group chat is performed.

FIG. 6 illustrates a processing procedure of the chatbot at a time of registration of a file according to this method. In this example, it is assumed that a method of registering a file in a shared folder (a shared file storage region) associated with a group chat is used as a method for registering a file in the group chat. The file stored in the shared folder can be used (e.g., viewed, printed) by a user participating in the group chat. The shared folder associated with the group chat is, for example, a LINE album in a chat service of LINE (Registered Trademark).

The chatbot monitors a shared folder corresponding to a group chat in which the chatbot is participating and executes the procedure of FIG. 6 in a case where a user (a registrant) stores a folder in the shared folder.

In this procedure, first, the chatbot (the operation controller 163) determines whether or not the stored file is a PW-protected file (S40). In a case where a result of the determination is No, it is unnecessary to cancel PW protection in order to print the file to be printed, and therefore the chatbot finishes the processing.

In a case where the result of the determination in S40 is Yes, the chatbot (the operation controller 163 and the reply message creating unit 164 controlled by the operation controller 163) posts a message inquiring a password of the file not on the group chat corresponding to the shared folder but on a one-to-one chat with the registrant (S42). Then, the chatbot waits for a reply of the registrant to the post for a predetermined period (S44).

In a case where the registrant posts a reply on the one-to-one chat within the predetermined period, the chatbot regards a character string included in the reply as a password and tries to cancel PW protection of the file to be printed by using the password (S46). In a case where the password is correct (a result of the determination in S48 is Yes), the chatbot succeeds in cancelling PW protection (S50). In this case, the chatbot gives a post for the registrant indicating that the file has become printable by using the entered password on the one-to-one chat or on the group chat corresponding to the shared folder (S52) and then stores the password in association with a file name (or file identification information) of the stored file (S54).

In a case where the result of the determination in S48 is No, i.e., in a case where the password is not correct, the chatbot fails to cancel PW protection (S56). In this case, the chatbot determines whether or not the number of trials (S46) of cancellation of PW protection has reached a predetermined threshold value (S58). In a case where the number of trials has not reached the predetermined threshold value, S42 is performed again in which the chatbot inquires a password again on the one-to-one chat. In a case where it is determined in S58 that the number of trials of cancellation of PW protection has reached the predetermined threshold value, the chatbot gives a post indicating that the stored file has not been made printable on the group chat or on the one-to-one chat (or both on the group chat and on the one-to-one chat) (S60). In this case, the chatbot causes data indicating that a password of the file is unknown to be stored in association with a file name of the file. In a case where it is determined in S44 that the registrant has not posted a password within the predetermined period, the chatbot assumes that the chatbot has failed to cancel PW protection and gives a post indicating that the stored file has not been made printable on the group chat or on the one-to-one chat (or both on the group chat and on the one-to-one chat) (S60).

Figure 7:
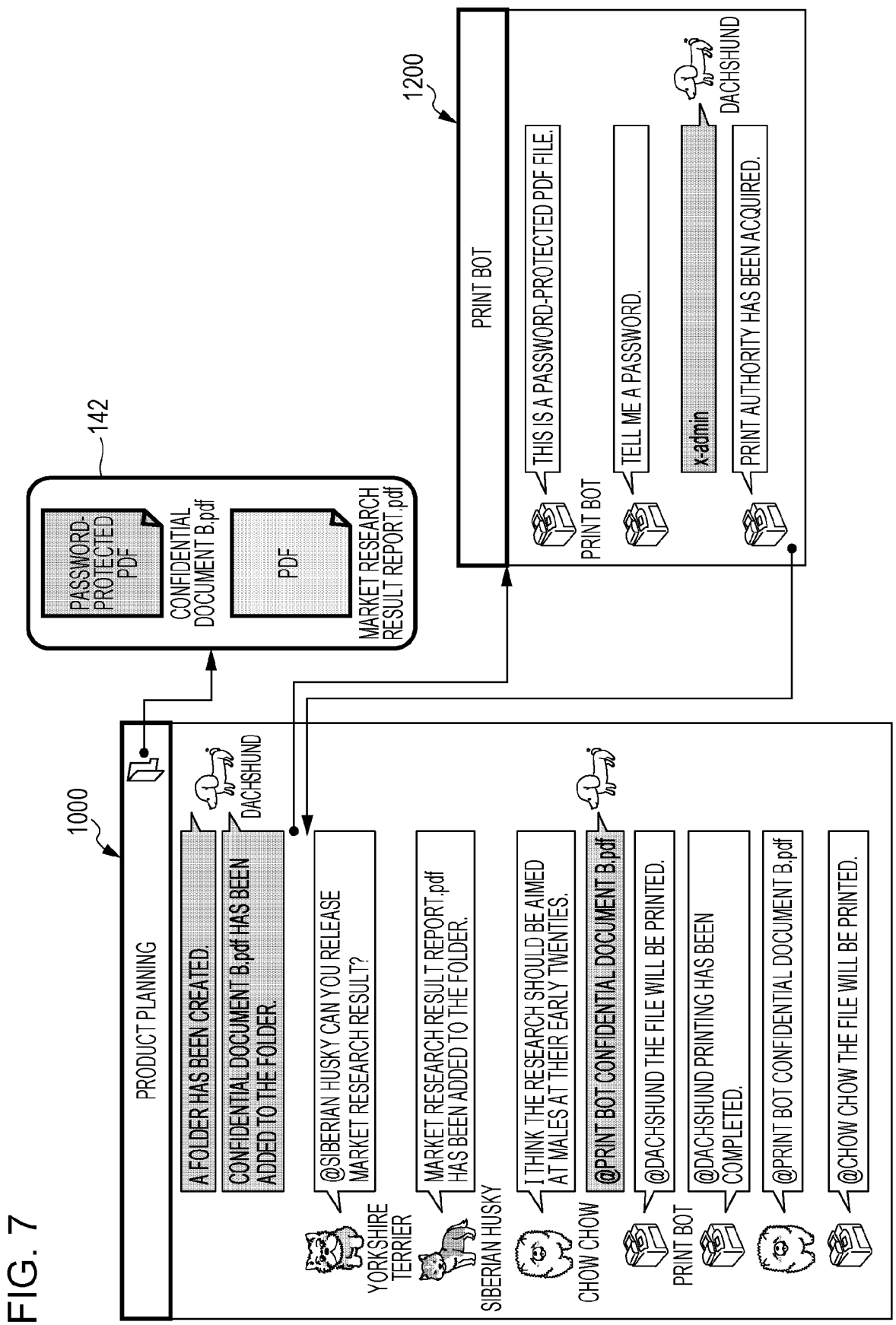
FIG. 7 illustrates an example of a screen of a group chat corresponding to the procedure of FIG. 6.

FIG. 7 illustrates an example of a dialogue on a chat corresponding to the processing of FIG. 6. FIG. 7 illustrates a screen 1000 of a group chat and a screen 1200 of a one-to-one chat that are displayed on a terminal of the user "dachshund".

In the example of FIG. 7, first, the user "dachshund" creates a shared folder 142 on the chat service server 14 by operating, for example, a setting button of the screen 1000 and then posts a message or the like indicating that a folder has been created on the group chat (the screen 1000). Next, the "dachshund" stores a file "confidential document B.pdf" in the shared folder 142 by operating the screen 1000 and gives a post indicating that the file "confidential document B.pdf" has been stored in the shared folder 142 on the group chat (the screen 1000). The "confidential document B.pdf" is a PW-protected file and therefore cannot be printed unless a password is presented.

Therefore, the chatbot gives a post inquiring a password on the one-to-one chat (the screen 1200) with the "dachshund" in order to acquire a password for printing of the file. In the example illustrated in FIG. 7, the chatbot ("Print Bot") posts a message "This is a password-protected PDF file." indicative of a reason of a subsequent inquiry about a password and then posts a message "Tell me a password.". In response to this, the "dachshund" posts a password "x-admin" on the one-to-one chat. The chatbot tries to cancel PW protection of the file "confidential document B.pdf" by using a character string "x-admin" included in the post. In the example illustrated in FIG. 7, the chatbot succeeds in cancelling PW protection of the file and therefore posts a message "Print authority has been acquired." on the one-to-one chat. Furthermore, the chatbot causes the password "x-admin" to be stored in the file information storage unit 166 in the bot server 16A in association with the file name "confidential document B.pdf".

Figures 8, 9:
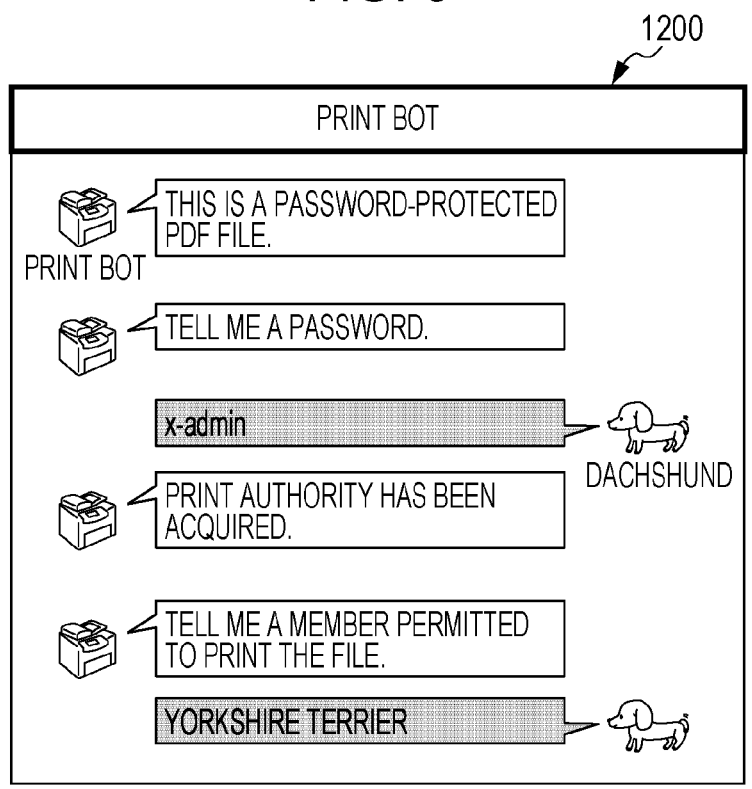
FIG. 8 is an explanatory view of a file information table.
FIG. 9 illustrates an example of a screen of a chat inquiring, from a person who has registered a file, a password and information on a person permitted to print the file.

FIG. 8 illustrates an example of a file information table in the file information storage unit 166. The file information table in this example is a table for each group chat. Identification information ("group 001" in the example illustrated in FIG. 8) of the group chat is associated with this table. A file name of each file stored in a shared folder associated with the group chat (and each file posted on the group chat), a password, and information on a registrant are registered in this table. These files include a file that is not PW-protected, and "none" is set in a password field for such a file. Furthermore, a value of a password field of a PW-protected file for which a registrant has not presented a password is "unknown". In a registrant field, an ID of a user who has stored the file in a shared folder (or posted the file on the group chat) is registered.

See FIG. 7 again. The user "Yorkshire terrier" gives a post asking a user "Siberian husky" to post a market research result on the group chat (the screen 1000). In response to this, the "Siberian husky" stores a file "market research result report.pdf" in the shared folder and then gives a post indicating that the file "market research result report.pdf" has been stored in the shared folder. It is assumed that the file "market research result report.pdf" is not PW-protected.

Next, the user "chow chow" posts an opinion, and then the "dachshund" gives a post instructing the chatbot to print the "confidential document B.pdf" on the group chat (the screen 1000). In this example, the chatbot is participating in the group chat by using a user name "Print Bot". In this example, the print command for the chatbot is posted in a form including a mention to the chatbot ("@Print Bot") and a file name of the file to be printed. The mention is a character string indicative of a destination of a post on the group chat and is constituted by "@" and a user name following "@".

Upon receipt of this print command, the chatbot reads out a password corresponding to the "confidential document B.pdf" from the file information table of the group chat since the "confidential document B.pdf" is a PW-protected file. Then, the chatbot cancels PW protection of the "confidential document B.pdf" by using the password, sends the "confidential document B.pdf" whose PW protection has been cancelled to an output destination printer, and then causes the output destination printer to print the "confidential document B.pdf". The chatbot gives a post for the "dachshund" indicating that printing will be executed on the group chat. When the printing is completed by the printer, the chatbot further gives a post indicating that the printing has been completed.

Next, another user "chow chow" gives a post instructing the chatbot to print the "confidential document B.pdf" on the group chat. The chatbot reads out the password corresponding to the "confidential document B.pdf" from the file information table, cancels PW protection of the "confidential document B.pdf" by using the password, sends the "confidential document B.pdf" to an output destination printer, and causes the output destination printer to print the "confidential document B.pdf". The chatbot gives a post for the "chow chow" indicating that printing will be executed on the group chat (illustration of the following posts is omitted).

In the market, there are printers hat have a function of receiving a PW-protected file and a password and printing the file by cancelling PW protection of the file by using the password. In a case where the output destination printer is this kind of printer, the chatbot may send the file and the password to the printer instead of cancelling PW protection of the file to be printed by itself.

Although a password for cancelling PW protection of a file is registered in association with a file name of the file in the file information table (the file information storage unit 166) in the example of FIG. 6, this is merely an example. Alternatively, a file whose PW protection has been cancelled by using the password may be registered in association with a file name of the file in the file information table. In this case, upon receipt of posting of a print command designating a file name of a PW-protected file on the group chat, the chatbot extracts a file whose protection has been cancelled corresponding to the file name from the file information table, sends the file to a printer, and causes the printer to print the file.

Although the example of FIGS. 6 and 7 is an example of a case where a file used in a group chat is stored in a shared folder, similar processing can be also applied to a file posted on the group chat itself by a user. Hereinafter, the user who has posted a file on the group chat is also referred to as a registrant.

Furthermore, there are cases where a user (a registrant) does not want to permit other users to print a file stored in a shared folder. In order to deal with such a case, for example, the chatbot inquires, of a registrant who has stored a file, whether or not to permit other users to print the file on a chat when acquiring a password from the registrant, and in a case where a reply of the registrant to the inquiry indicates that the registrant does not permit the other users to print the file, the chatbot records, in the file information table, information indicating that the file is printable only by the registrant. In a case where a print command to print a PW-protected file is posted on a group chat, the chatbot determines whether or not the PW-protected file is a file "printable only by the registrant" by checking the file information table. In a case where the PW-protected file is a file "printable only by the registrant", the chatbot permits printing in a case where a person who has posted the print command is the registrant and does not permit printing in a case where the person who has posted the print command is a person other than the registrant. Furthermore, in a case where the PW-protected file is not a file "printable only by the registrant", the chatbot permits printing even in a case where a user who has posted the print command is not the registrant.

Furthermore, there are cases where a registrant who has registered a file on a group chat (i.e., has posted the file on the chat itself or stored the file in a shared folder) wants to permit not all users participating in the group chat but some of the users to print the file. In order to deal with such cases, the chatbot may request a registrant who has posted a password of a registered file on a one-to-one chat to designate a user who is permitted to print the file. FIG. 9 illustrates an example of a screen 1200 of a one-to-one chat between a registrant and a chatbot in this case.

The example of the screen of FIG. 9 replaces the screen 1200 of the one-to-one chat in the example of the screen in FIG. 7. On the screen 1200 illustrated in FIG. 9, the chatbot inquires a password from a registrant "dachshund", the "dachshund" answers the password in response to this, and the chatbot confirms that protection of a file can be cancelled by using the password and posts a message "Print authority has been acquired." These processes are identical to those in the example of FIG. 7. Then, the chatbot posts a message "Tell me a member permitted to print the file." on the one-to-one chat. In response to this, the "dachshund" posts a user name of a member permitted to print the file among members of the group chat on the one-to-one chat. In the example illustrated in FIG. 9, the "dachshund" posts a name "Yorkshire terrier" as a member permitted to print the file.

Figures 10, 11:
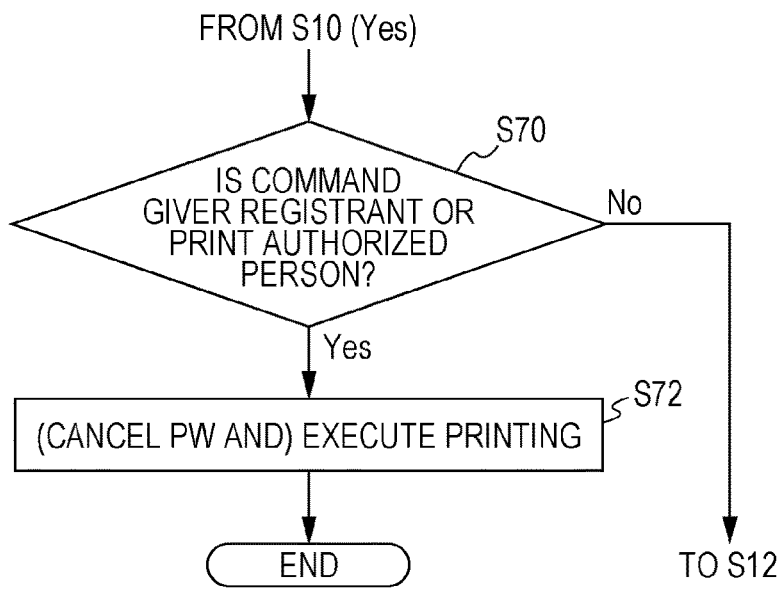
FIG. 10 is an explanatory view of a file information table including information on a print authorized person permitted to print a file.
FIG. 11 illustrates a processing procedure of the chatbot that permits a registrant of a file and a print authorized person to print the file without entry of a password.

The chatbot registers, in the file information table, the user name of the member permitted to print the file answered by the registrant in response to the inquiry. FIG. 10 illustrates an example of the file information table in this case. In the example of FIG. 10, a "print authorized person" field is added to the file information table illustrated in FIG. 8. The print authorized person is a person who has been permitted to print a file registered in a group chat by a registrant among members of the group chat. That is, a list of user names of users designated as users permitted to print the file by the registrant is recorded in the "print authorized person" field. In the example of FIG. 9, the "dachshund" who has registered the "confidential document B.pdf" designates the "Yorkshire terrier" as a member permitted to print the file, and therefore the "dachshund" and the "Yorkshire terrier" are registered in the "registrant" field and the "print authorized person" field of the "confidential document B.pdf" of the file information table, respectively.

FIG. 11 illustrates part of a processing procedure of the chatbot in a case where a user gives a print command to print a PW-protected file on a group chat in an example in which a registrant designates a person (a print authorized person) permitted to print the file when registering the file. The example of FIG. 11 is a partial procedure inserted between S10 and S12 of the processing procedure illustrated in FIG. 4. In a case where it is determined in S10 that the file to be printed is a PW-protected file, the chatbot determines whether or not a command giver who has given a print command is a registrant who has registered the file in the group chat or a print authorized person permitted to print the file by the registrant (S70). This determining process is performed by referring to the file information table (see FIG. 10). In a case where a result of the determination in S70 is Yes, i.e., in a case where the command giver is the registrant or the print authorized person, the chatbot cancels PW protection of the file by using a password of the file stored in the file information table (or acquires a file whose PW protection has been cancelled registered in the file information table) and then causes a printer to print the file whose protection has been cancelled (S72). Meanwhile, in a case where the result of the determination in S70 is No, the chatbot proceeds to the processes in S12 and subsequent steps (see FIG. 4). That is, in this case, the chatbot inquires a password from the command giver on a one-to-one chat, and in a case where the command giver replies a correct password in response to the inquiry, the chatbot prints the file by using the password.

Figure 12:
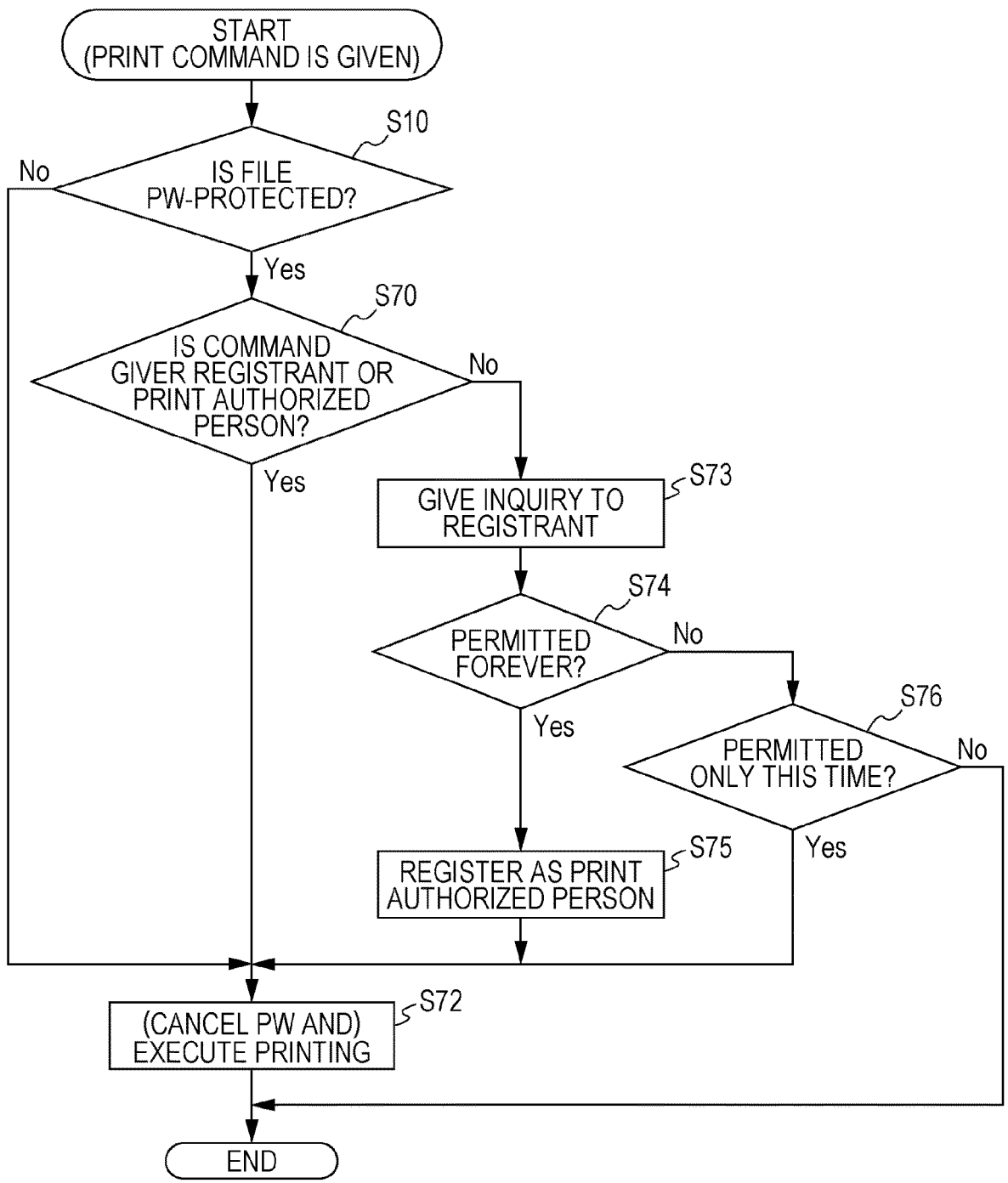
FIG. 12 illustrates another example of a processing procedure of the chatbot.

In the example of FIG. 11, in a case where the command giver is neither the registrant nor the print authorized person, the chatbot inquires a password from the command giver (the processes in S12 and subsequent steps in FIG. 4). However, this is merely an example. In such a case, the chatbot may inquire, of the registrant, whether or not to permit the print command of the command giver on a chat. FIG. 12 illustrates a procedure in this example. The procedure of FIG. 12 is executed in a case where any one of users posts a print command on a group chat.

In this procedure, the chatbot first determines whether or not a file that is a target of a print command is PW-protected (S10) and then causes a printer to print the file in a case where the file is not PW-protected (S72).

In a case where the result of the determination in S10 is Yes, the chatbot determines whether or not a command giver who has given the print command is a registrant of the file or a print authorized person on the basis of the file information table (S70). In a case where the command giver is the registrant or the print authorized person, the chatbot executes processing for causing a printer to print the file by using a password of the file registered in the file information table (S72).

In a case where the result of the determination in S70 is No, the chatbot inquires, of the registrant of the file, whether or not to permit execution of the print command of the command giver on a group chat or on a one-to-one chat with the registrant (S73). For example, the chatbot posts, on the chat, an inquiring message presenting three options (1) permitted this time only; (2) permitted forever, and (3) refused, and the registrant replies a number of a selected option on the chat in response to the inquiry. The chatbot determines whether or not the reply is (2) permitted forever (S74). In a case where a result of this determination is Yes, the chatbot adds a user name of the command giver to a list of print authorized persons in the file information table (FIG. 10) (S75), cancels PW protection of the file, and then causes a printer to print the file (S72). In a case where the result of the determination in S74 is No, the chatbot determines whether or not the reply of the registrant is (1) permitted this time only (S76). In a case where a result of this determination is Yes, the chatbot cancels PW protection of the file and then causes a printer to print the file (S72). In a case where the result of the determination in S76 is No, the chatbot finishes the processing without executing the print command. In this case, the chatbot may post, on the group chat, a message for the command giver indicating that the file cannot be printed.

As described above, it is also possible to provide a mechanism in which a registrant who has registered a PW-protected file in a group chat or in a shared folder of the group chat limits a user to which a password is applied, i.e., a user permitted to use the password (and to print a file whose PW protection has been cancelled by using the password). In this case, a registrant designates a user to which a password that is secret information is applied, and the chatbot registers, in the file information table, information on the designated user in association with identification information (e.g., a file name) of the file. Upon receipt of a print command to print the file from a user on the group chat, the chatbot determines whether or not the user is the user to which the password of the file is applied on the basis of information held in the file information table. In a case where the user is the user to which the password of the file is applied, the chatbot executes print processing by using the password.

This is more generalized as follows. Specifically, the registrant enters, in the chatbot, specifying information specifying a user among members of a group chat, and the chatbot executes specific processing such as printing of a file by using secret information such as a password in a case where a user who has given a command to execute the specific processing on the group chat is the user specified by the specifying information.

Restriction of Copy

It is not impossible for a print authorized person who has printed a file without presenting a password to the chatbot according to the processing described with reference to FIGS. 9 and 10 to copy a print result by using a copying machine and give the copy to a third party. However, a registrant (e.g., a creator who created the file) sometimes does not desire such copying using a copying machine because of a security concern.

It is also possible to provide different levels of security. For example, the registrant may tell a password for file printing in advance to a member who is reliable enough not to, for example, leak information among members of a group chat and may register, in the chatbot, a person who is not sufficiently reliable as a print authorized person without telling the password. In this case, the registrant sometimes does not want the print authorized person to copy a print result of the file.

In view of this, the chatbot prints a PW-protected file after cancelling PW protection of the file and then adding additional information (watermark) for inhibiting copying using a copying machine, in a case where a person who has given a command to print the file is not a registrant of the file but a print authorized person. For example, such additional information (watermark) may be a preset character string (e.g., "confidential") to be printed on a background or may be one that is not observable on a print result but makes a copy result obtained by a copying machine unreadable, for example, by making the copy result black.

Figure 13:
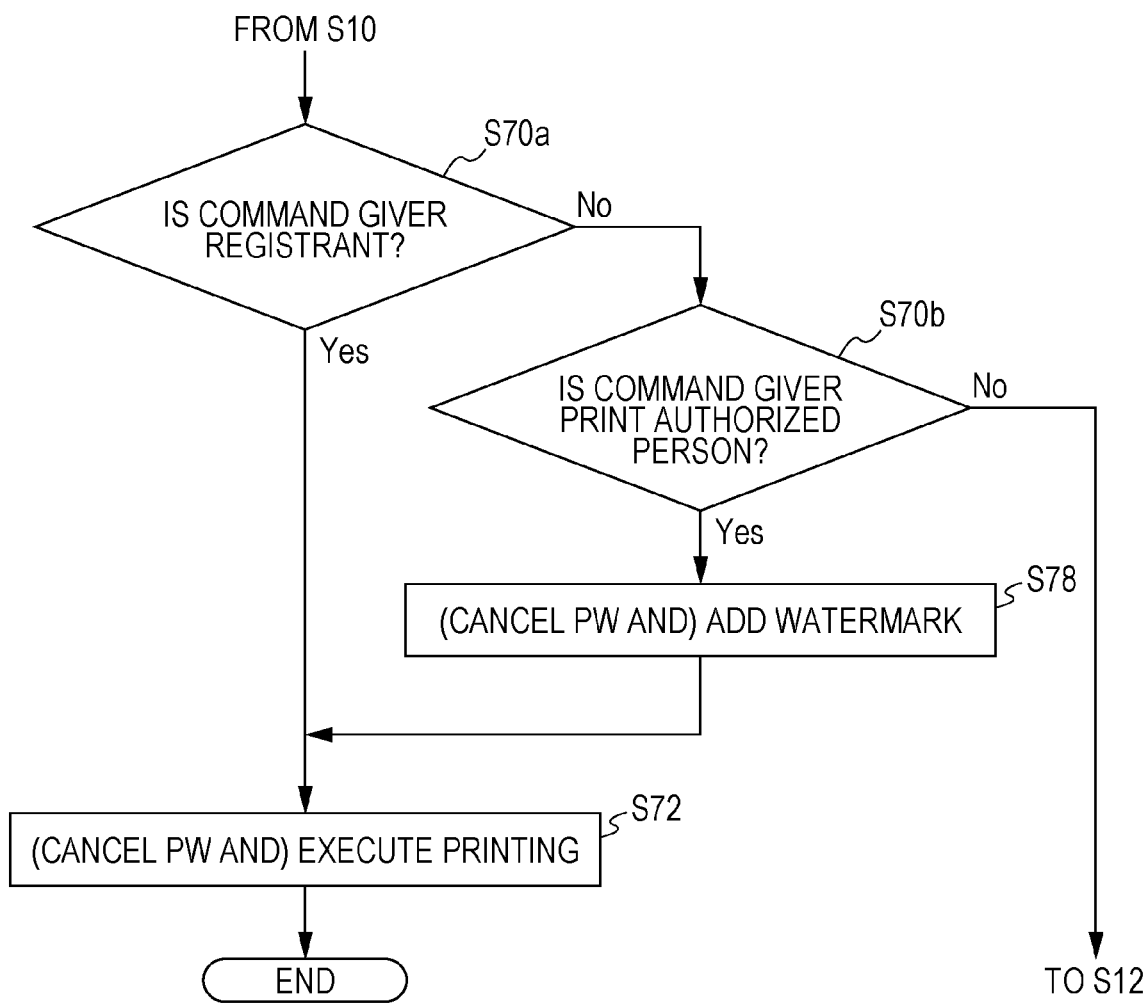
FIG. 13 illustrates an example of a processing procedure of the chatbot that adds a watermark in a case where a file is printed while omitting entry of a password.

FIG. 13 illustrates a substantial part of a processing procedure concerning this copy restriction function. The partial procedure of FIG. 13 is inserted between S10 and S12 of the procedure of FIG. 4. In a case where it is determined in S10 that a file to be printed is a PW-protected file, the chatbot determines whether or a command giver who has given a print command is a registrant who has registered the file in the group chat (S70a). In a case where a result of the determination is Yes, the chatbot cancels PW protection of the file (or acquires a file whose PW protection has been cancelled registered in the file information table) and then causes a printer to print the file whose protection has been cancelled (S72). Meanwhile, in a case where the result of the determination in S70a is No, the chatbot determines whether or not the command giver is a print authorized person permitted to print the file by the registrant (S70b). In a case where a result of the determination in S70b is Yes, the chatbot cancels PW protection of the file (or acquires a file whose PW protection has been cancelled registered in the file information table), adds a predetermined watermark image to an image of the file whose protection has been cancelled, and then causes a printer to print the image to which the predetermined watermark image has been added (S72). Meanwhile, in a case where the result of the determination in S70b is No, the chatbot proceeds to the processes in S12 and subsequent steps (see FIG. 4).

Furthermore, the registrant may classify a print authorized person into a "member for whom a watermark is added" and a "member for whom a watermark is not added" depending on reliability of the print authorized person.

Furthermore, in a case where a PW-protected file is registered in a shared folder associated with a group chat before the chatbot is invited to the group chat (or while the chatbot is not participating in the group chat), the chatbot cannot inquire a password of the file from a registrant at a time of the registration. In this case, when a print command to print the file is given, the chatbot acquires the password by any of the other methods exemplified above, for example, from a command giver who has given the command or the registrant. In this case, the chatbot may register, in the file information table, an acquired password (or a file whose PW protection has been cancelled by using the password) in association with a file name of the file. In this case, in a case where a print command to print the file is given in the future, the chatbot may read out the password of the file (or the file whose PW protection has been cancelled) from the file information table and use the password for printing.

Method of Inquiring PW Holder from Print Command Giver

For example, in the procedures described with reference to FIGS. 4, 6, 11, and 12, it is assumed that a command giver who has given a print command to print a PW-protected file on a group chat or a registrant who has registered the PW-protected file in the group chat knows a password for printing the PW-protected file. However, in a case where this assumption is not established, the file cannot be printed. An example of such a case is a case where a user who has acquired a file from a file creator registers the file in a group chat without knowing that the file is PW-protected as an unprintable file and without knowing a password for cancelling PW protection (it is assumed that the user can view the file). Another example is a case where a first member of a group chat receives a PW-protected file from a second member through a means (e.g., on a one-to-one chat between the first member and the second member) other than the group chat and the first member posts the PW-protected file on the group chat and gives a print command to the chatbot without being told a password from the second member.

Even in such cases, the command giver sometimes recognizes from whom the PW-protected file has been acquired. In view of this, the following describes a method in which the chatbot inquires, of the command giver, a person (a PW holder) who knows a password and inquires the password from the PW holder.

Figure 14:
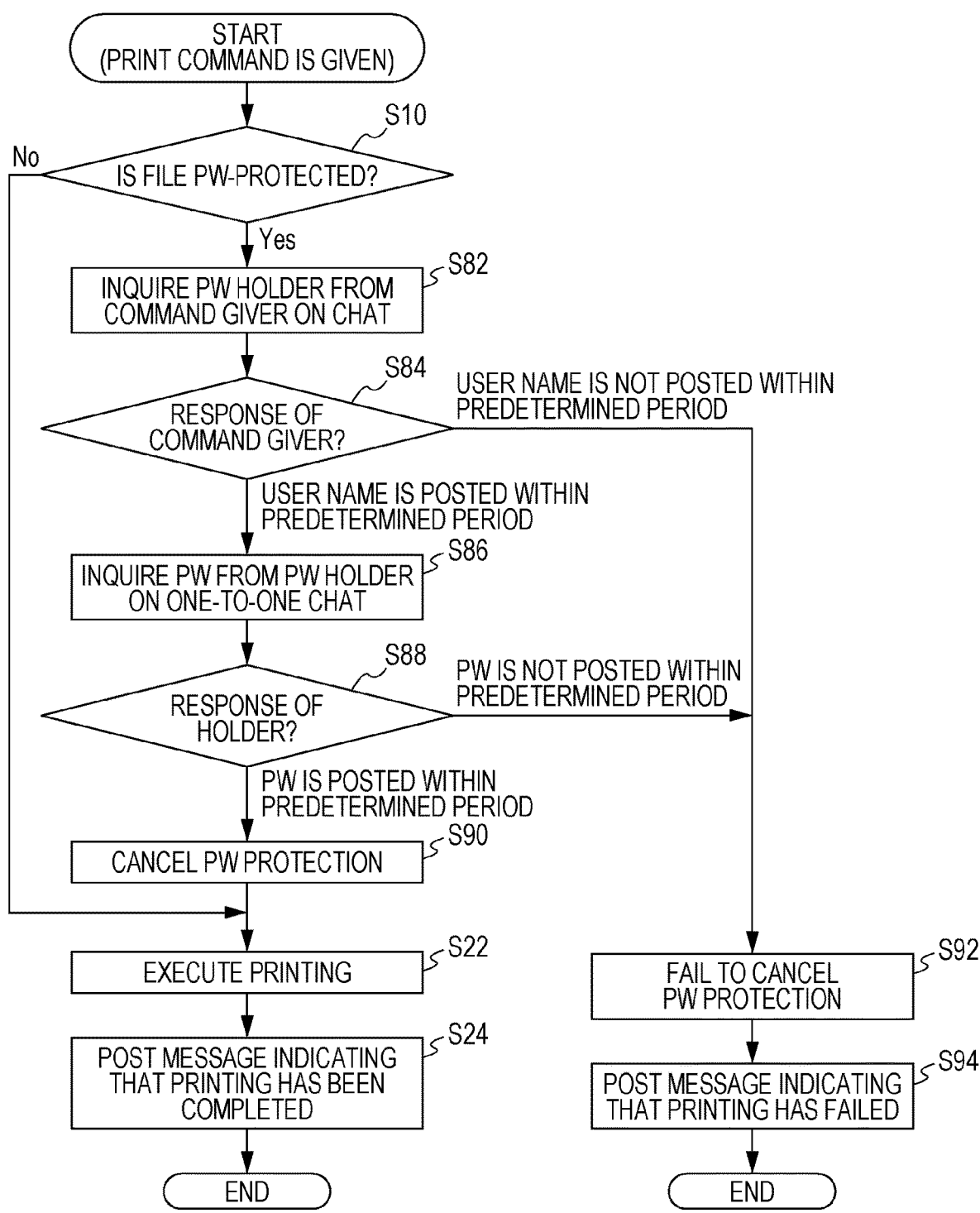
FIG. 14 illustrates another example of a processing procedure of the chatbot in a case where a print command is posted on a group chat.

FIG. 14 illustrates a processing procedure of the chatbot using this method. The procedure of FIG. 14 is executed when any one of users posts a print command on a group chat.

In this procedure, first, the chatbot (the operation controller 163) determines whether or not a file designated as a target to be printed in the print command is a PW-protected file (S10). In a case where a result of this determination is No, the chatbot performs processing for causing a printer to print the file (S22). When the printing is completed, the chatbot gives a posting indicating that the printing has been completed on the group chat (S24) (similar to the procedure of FIG. 4).

In a case where the result of the determination in S10 is Yes, the chatbot (the operation controller 163 and the reply message creating unit 164 controlled by the operation controller 163) gives a post inquiring a user name (or a user ID) of a person (a PW holder) who knows a password of the file on a one-to-one chat with the command giver or on the group chat (S82). Knowledge of the user name of the PW holder does not mean that the PW-protected file becomes printable, and therefore posting of the inquiry and a reply of the command giver to the inquiry on the group chat does not pose a serious problem to security of the PW-protected file. However, in a case where the chatbot is operated according to a policy that an inquiry of a PW holder should not be posted on a group chat, this inquiry need just be posted on a one-to-one chat with a command giver. Then, the chatbot waits for a reply of the command giver to the post for a predetermined period (S84).

In a case where the command giver gives a post on the chat on which the inquiry in S82 was posted within the predetermined period, the chatbot recognizes the user name of the PW holder from the post. In a case where the chatbot fails to recognize a user name of a user registered in the chat service server from the post, the chatbot gives a post for the command giver indicating that a user name has not been recognized and including a text inquiring the user name of the PW holder again on the chat. In a case where a user name has been recognized from the post of the command giver, the chatbot gives a post inquiring a password on a one-to-one chat of the user (the PW holder) having the recognized user name (S86). This post includes a text indicating that a [character string of a user name of the command giver] has given a print command to print a [character string of a file name of the file that is a target of the print command], a text inquiring whether to permit or refuse this printing, and a text requesting presentation of a password in a case where the printing is permitted. Then, the chatbot waits for a reply of the PW holder to the post for a predetermined period (S88).

In a case where the PW holder posts a password on the one-to-one chat, the chatbot cancels PW protection of the PW-protected file by using the password included in the post (S90). In this example, the processes for presentation of a password are collectively performed in S90 for simplification of description. More specifically, processes similar to the processes in S16, S18, S20, S26, S28, and S30 in FIG. 4 need just be performed as the processes in S90. In a case where PW protection is successfully cancelled in S90, the chatbot performs processing for causing a printer to print the file (S22) and gives a post indicating that the printing has been completed on the group chat when the printing is completed (S24).

In a case where the PW holder posts a reply refusing command giver's printing on the one-to-one chat in S88 or in a case where the PW holder does not post a reply within the predetermined period in S88, the chatbot fails to cancel PW protection of the file (S92) and gives a post indicating that the file cannot be printed on the group chat (S94).

Furthermore, in a case where the command giver does not post a user name of the PW holder within the predetermined period, the chatbot fails to cancel PW protection of the file (S92) and gives a post indicating that the file cannot be printed on the group chat (S94).

Figure 15:
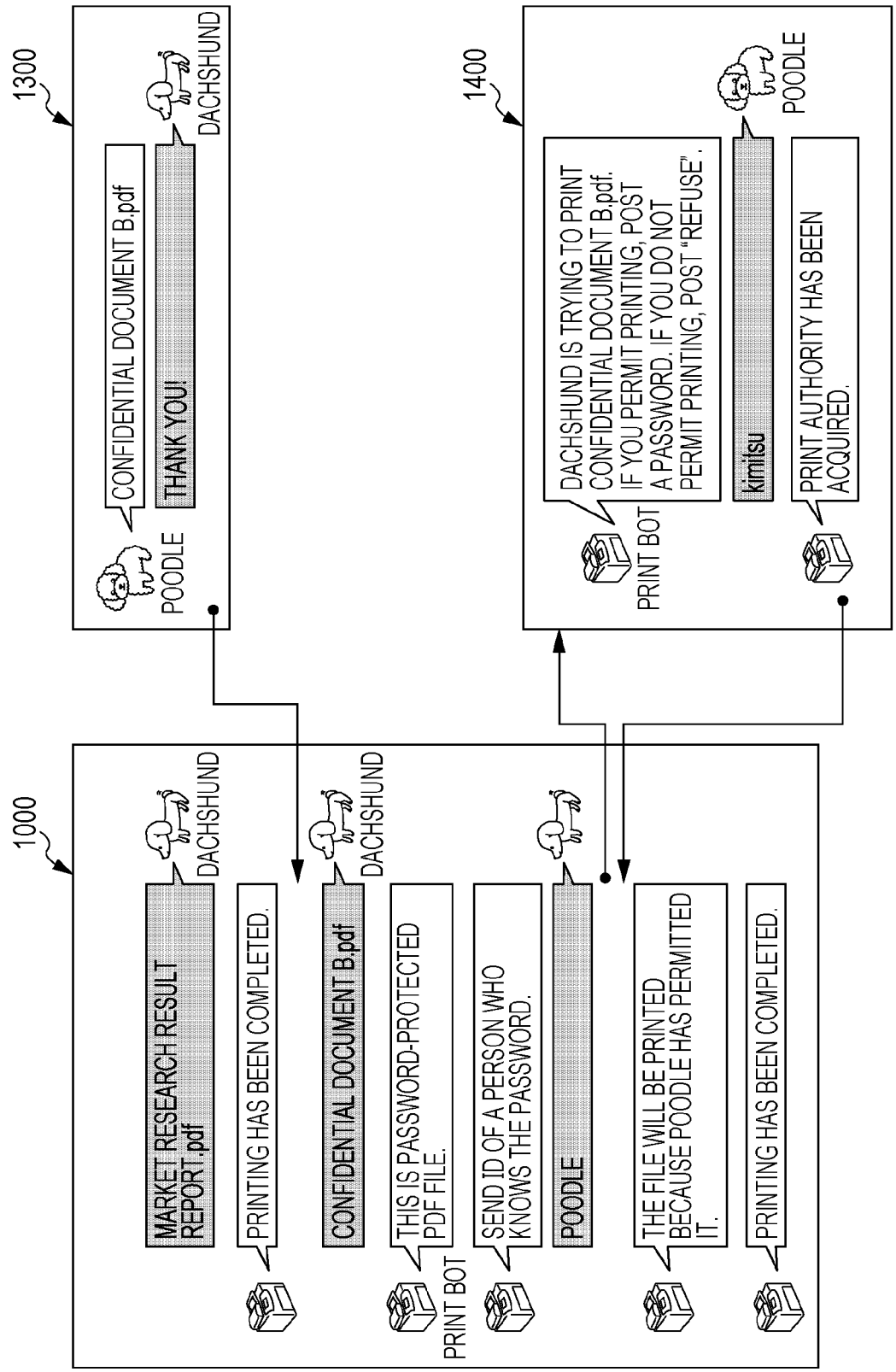
FIG. 15 illustrates an example of a screen of a chat corresponding to the procedure of FIG. 14.

FIG. 15 illustrates an example of a dialogue on a chat corresponding to the processing of FIG. 14. FIG. 15 illustrates a screen 1000 of a group chat and a screen 1400 of a one-to-one chat that are displayed on the terminal of the user "dachshund" and a screen 1500 of a one-to-one chat displayed on a terminal of a user "poodle".

In the example of FIG. 14, it is assumed that when a user posts a file on a chat, the chatbot is configured to automatically print the file without a print command.

In this example, first, the user "dachshund" posts a file "market research result report.pdf" that is not PW-protected on the group chat (the screen 1000), and then the chatbot causes a printer to print the file and posts a message "Printing has been completed." on the group chat when the printing is completed.

Furthermore, it is assumed that the user "poodle" posts a file "confidential document B.pdf" that is PW-protected on the one-to-one chat (the screen 1300) between the "poodle" and the "dachshund" and the "dachshund" receives the file.

Then, the "dachshund" posts the "confidential document B.pdf" on the group chat (the screen 1000). The chatbot tries to print the "confidential document B.pdf" since the "confidential document B.pdf" having a file format (PDF in this example) that is a print target has been posted, but the file is PW-protected. In view of this, the chatbot posts a message "This is a password-protected PDF file." and a message "Send an ID of a person who knows the password." inquiring an ID (e.g., a user name) of a PW holder of the file on the group chat (the screen 1000). In response to this post, the "dachshund" posts a user name of the "poodle" who has given the file on the group chat.

In response to this, the chatbot posts a message "Dachshund is trying to print the confidential document B.pdf. If you permit printing, post a password. If you do not permit printing, post "refuse"." on the one-to-one chat (the screen 1400) with the "poodle". That is, the chatbot notifies the "poodle" about the file name of the PW-protected file that is a target of the print command and the user name of the command giver and asks the "poodle" to post a password in a case where the "poodle" permits printing and post "refuse" in a case where the "poodle" does not permit printing. In this example, the "poodle" posts a password "kimitsu" for permitting the printing on the one-to-one chat.

The chatbot posts a message "The file will be printed because poodle has permitted it." on the group chat (the screen 1000), cancels PW protection of the file "confidential document B.pdf" by using the password "kimitsu", and then causes a printer to print the file. When the printing is completed, the chatbot gives a post indicating that the printing has been completed.

Although a PW holder is inquired from a command giver instantly in a case where a target of a print command is a PW-protected file in the procedure of FIG. 14, this is merely an example. Alternatively, for example, first, a password may be inquired from a command giver on a one-to-one chat as in the procedure of FIG. 4, and a PW holder may be inquired from the command giver in a case where a reply from the command giver indicates that the command giver does not know the password. Alternatively, in a case where the command giver is neither a registrant nor a print authorized person (see FIG. 7) and where the command giver cannot answer a password, a PW holder may be inquired from the command giver.

Alternatively, first, the chatbot may inquire a password from the command giver on a one-to-one chat as in the procedure of FIG. 4, and in a case where the command giver answers a user name in response to the inquiry, the chatbot may regard the user name as a user name representing a PW holder and inquire a password from this user on a one-to-one chat.

In the example described with reference to FIGS. 14 and 15, the chatbot inquires a PW holder of a file to be printed from a command giver. Alternatively, the chatbot may inquire a password from a creator indicated by a creator (owner) attribute of the file. In this case, the chatbot may check whether or not the creator is included in members of the group chat and may inquire a password from the creator only in a case where the creator is included in the members. Alternatively, the chatbot may first inquire a PW holder from the command giver and then inquire a password from the creator only in a case where a reply of the command giver indicates that the command giver does not know the PW holder.

Method of Inquiring Password from Person Who has Posted File

In a case where a file that is a target of a print command posted on a group chat is a file that has been posted on the group chat (or stored in a shared folder), the chatbot can grasp who has posted the file (or stored the file in the shared folder). Accordingly, the chatbot may inquire a password from the person who posted the file (or from a registrant).

Figure 16:
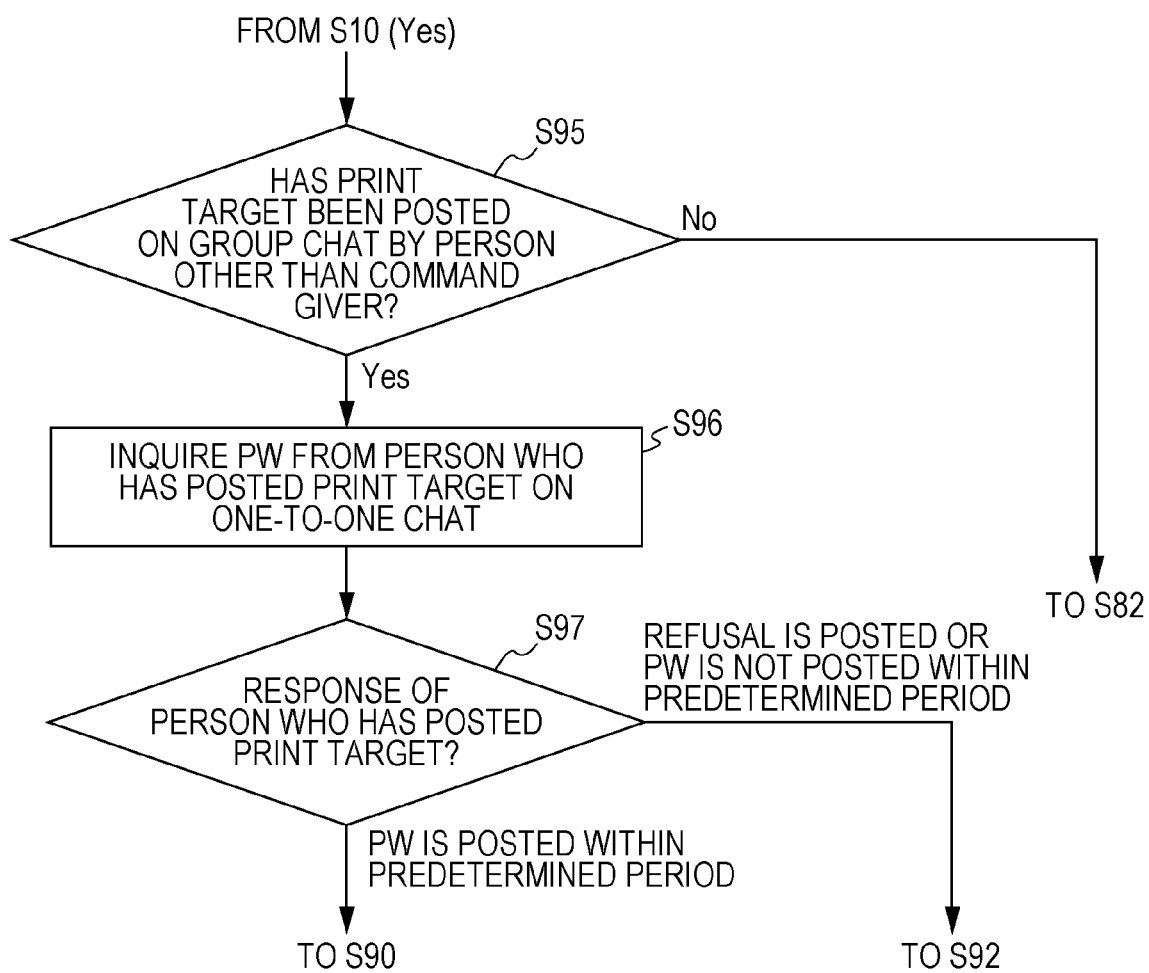
FIG. 16 illustrates a part of a processing procedure of the chatbot that inquires a password from a person who has posted a file.

FIG. 16 illustrates a procedure in this example. The procedure of FIG. 16 is a partial procedure inserted between S10 of S82 of the procedure of FIG. 14. In this procedure, in a case where a target of the print command is a PW-protected file (Yes in S10), a person who has posted the PW-protected file on the group chat (or stored the PW-protected file in the shared file) is specified, and it is determined whether or not the person is a person other than a command giver who has given the print command (S95). In a case where a result of the determination in S95 is No, the processing proceeds to S82 (see FIG. 14).

In a case where the result of the determination in S95 is Yes, the chatbot inquires a password from the person who has posted the file on a one-to-one chat (S96). Then, the chatbot waits for a response from the person who has posted the file to the inquiry for a predetermined period (S97). In a case where the person who has posted the file posts a password on the one-to-one chat within the predetermined period, the chatbot performs processes in S90 (see FIG. 14) and subsequent steps. In this case, PW protection of the file is cancelled by using the posted password, and the file is printed. Meanwhile, in a case where the person who has posted the file does not give a reply within the predetermined period or in a case where the person who has posted the file gives a reply indicative of refusal, the chatbot proceeds to S92 (see FIG. 14).

In the above example, the partial procedure of FIG. 16 is combined with the procedure of FIG. 14. However, this is merely an example. Alternatively, for example, the partial procedure of FIG. 16 may be inserted between S10 and S12 of the procedure of FIG. 4.

Figure 17:
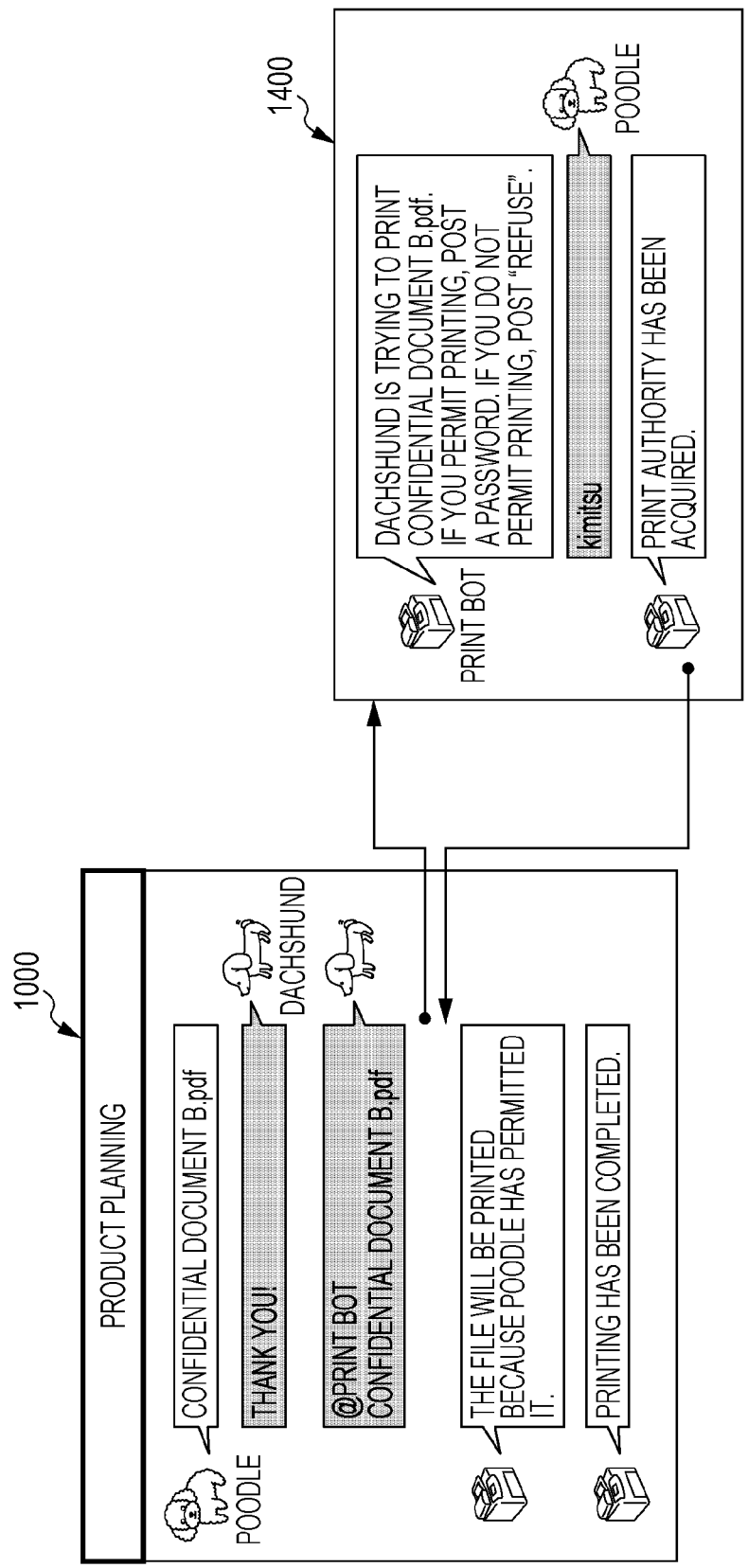
FIG. 17 illustrates an example of a screen of a chat corresponding to the procedure of FIG. 16.

FIG. 17 illustrates an example of a dialogue on a chat corresponding to the processing of FIG. 16. FIG. 17 illustrates a screen 1000 of a group chat displayed on the terminal of the user "dachshund" and a screen 1400 of a one-to-one chat displayed on the terminal of the user "poodle".

In the example of FIG. 16, first, the user "poodle" posts a PW-protected file "confidential document B.pdf" on the group chat (the screen 1000). In response to this, the "dachshund" posts a thank-you message and posts a command ("@Print Bot confidential document B.pdf") instructing the chatbot (a user name "Print Bot") to print the "confidential document B.pdf" on the group chat.

In response to this, the chatbot tries to print the file "confidential document B.pdf", but the file is PW-protected. In view of this, the chatbot specifies a user who has posted the file (or registered the file) by checking a history of messages posted on the group chat (or information of a registrant in the file information table (FIG. 8) concerning the file stored in the shared folder). In this case, the "poodle" is the user. The chatbot posts a message "Dachshund is trying to print confidential document B.pdf. If you permit printing, post a password. If you do not permit printing, post "refuse"." on the one-to-one chat (the screen 1400) with the "poodle". In this example, the "poodle" posts a password "kimitsu" for permitting printing on the one-to-one chat.

The chatbot posts a message "The file will be printed because poodle permitted it." on the group chat (the screen 1000), cancels PW protection of the file "confidential document B.pdf" by using the password "kimitsu", and then causes a printer to print the file. When the printing is completed, the chatbot gives a post indicating that the printing has been completed on the group chat.

PW Protection Service Using Chatbot

In the above examples, it is assumed that a user gives PW protection in advance to a file so as to make the file unprintable by using an appropriate application (e.g., Acrobat (Registered trademark) of Adobe (Registered trademark)). However, such PW protection requires, for example, activating the application and performing an operation for protection and is therefore troublesome In view of this, in this example, the chatbot gives PW-protection to a file in response to a command from a user.

Figure 18:
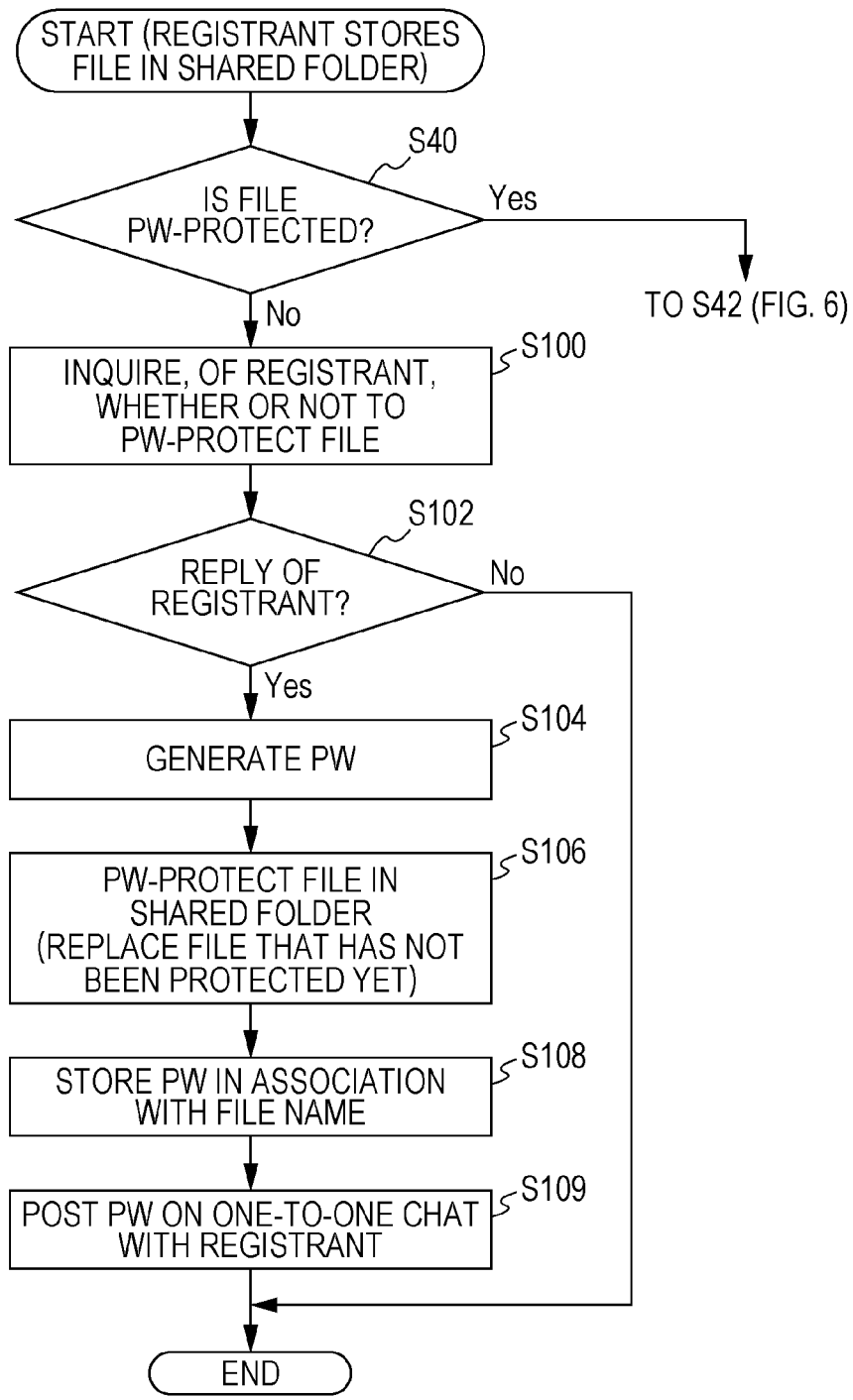
FIG. 18 illustrates a processing procedure of a chatbot having a function of executing password protection.

FIG. 18 illustrates a processing procedure of the chatbot in this example. The procedure of FIG. 18 is based on the procedure of FIG. 6. Execution of this procedure is triggered by user's registration of a file in a shared folder of a group chat.

In this procedure, the chatbot checks whether or not the registered file is PW-protected (S40). In a case where a result of this determination is Yes, the processing proceeds to S42 of FIG. 6 in which a password is inquired from a registrant.

In a case where the result of the determination in S40 is No, the chatbot inquires, of the registrant, whether or not to give PW protection to the file on the group chat or on a one-to-one chat with the registrant (S100). Then, the chatbot waits for a reply from the registrant for a predetermined period (S102). In a case where the registrant gives a post indicating that the registrant desires PW protection within the predetermined period on the chat, the chatbot generates a password (S104) and gives PW protection to the file in the shared folder by using the password so as to make the file unprintable (S106). The chatbot is a member of the group chat and has power of editing the file in the shared folder of the group chat and therefore can performs an operation of giving PW protection to the file. This turns the file stored in the shared folder into a PW-protected file.

Furthermore, the chatbot registers, in the file information table (see FIG. 8), the password generated in S104 in association with a file name of the file (S108). Furthermore, the chatbot notifies the registrant about the password on the one-to-one chat with the registrant (S109). Since the registrant has the file that has not been PW-protected yet, S109 is not necessary.

In a case where the reply of the registrant to the inquiry of S100 is "PW protection is not given", the chatbot finishes the series of processes by skipping S104 to S109.

In a case where the chatbot gives PW protection to a file stored in a shared folder of a group chat as described above, there is a possibility that a member of the group chat other than a registrant acquire the file that has not been protected yet during a period from storage of the file to PW protection performed by the chatbot. In order to deal with this concern, the chatbot may receive a file to be protected from a user on a one-to-one chat with the user. In this case, the user posts the file on the one-to-one chat or stores the file in a shared folder of the one-to-one chat. Upon detection of posting of the file or storage of the file in the shared folder, the chatbot inquires, of the user, whether or not to give PW protection to the file on the one-to-one chat. In a case where a replay of the user to the inquiry indicates a desire for PW protection, the chatbot generates a password and gives PW protection to the file by using the password as in the procedure of FIG. 18. Furthermore, the chatbot inquires, of the user, in which group chat the PW-protected file is to be registered on the one-to-one chat. In a case where the user answers an identification name of a group chat in which the file is to be registered in response to this inquiry, the chatbot stores the PW-protected file in a shared folder of the group chat (or posts the file in the group chat).

As a modification of the procedure of FIG. 18, in a case where all members belonging to a group chat belong to the same department of an organization, the chatbot may be configured not to perform processing for giving PW protection to a file even in a case where the file that has not been PW-protected is registered in the group chat. This is because it is generally unnecessary to limit printing of a file among members belonging to the same department of an organization. This is an example and is generalized as follows. Specifically, in a case where an attribute of a user belonging to a group chat meets a predetermined condition, the chatbot may be configured not to perform processing for giving PW protection to a file even in a case where the file that has not been PW-protected is registered in the group chat. The "predetermined condition" may be set in advance for the group chat by a member of the group chat.

The exemplary embodiment described above is merely an illustrative example.

For example, although a one-to-one chat with a user is used as a means by which the chatbot inquires a password from the user, this is merely an example. It is only necessary that this inquiry be given by using a communication means different from a group chat on which a print command was given. The "different communication means" is not limited as long as contents (a password) of communication from a user to which the inquiry has been given are not displayed on a screen of a group chat which other users belonging to the group chat do not see. Examples of such communication means include various kinds of means, such as an e-mail or a short message service, that does not use the chat service server 14.

Furthermore, in a case where the chatbot inquires a password from a command giver or a registrant, the chatbot may post a UI (user interface) component including a password entry field on a group chat. A user who has received the inquiry enters a password in the entry field of the UI component displayed on a chat screen of a terminal of the user. This UI component is, for example, programmed so that a character string entered in the entry field is displayed for a preset person among users belonging to the group chat but is hidden for other persons (e.g., not displayed or replaced with a predetermined dummy character string (e.g., a string of a predetermined number of "*"). By configuring the UI component so that the entered character string is displayed for a person who enters a password and the chatbot and is hidden for other persons, the password entered by the user is transmitted to the chatbot but is not observable for the other users. The UI component thus configured, which allows a password entered by a user to be transmitted only to the chatbot without displaying the password on a group chat screen of other users, functions as the "different communication means".

In the above description, an example in which the chatbot executes print processing by cancelling PW protection of a file for which a print command has been given on a group chat has been described. However, the various methods exemplified above are applied not only to a print command for a PW-protected file, but also to a command to execute processing using a file and requiring entry of a password in execution of the processing. The command is, for example, a command to, for example, edit, copy, transfer, or store a file that cannot be edited nor copied without entry of a password or a file that cannot be transferred to a third party nor stored in another storage region without entry of a password. Furthermore, the processing is not limited to processing using a file as long as the processing is processing that requires entry of a password or the like in execution of the processing. Examples of the processing include processing that requires entry of a password issued at a time of reservation in a case where a user gives a command to cancel the reservation that has been already made to a chatbot that executes restaurant reservation processing. Furthermore, a password is merely an example of information that should be kept secret from an unspecified number of users, and any of other various kinds of information such as a user ID may be used. That is, the various methods exemplified above are applicable to cases in general in which a user instructs, on a group chat, a chatbot to execute some sort of processing (referred to as specific processing) that requires entry of information (referred to as secret information) that should be kept secret from an unspecified user among users belonging to the group chat. In such a case, the chatbot which has been instructed to execute specific processing by a user on a group chat inquires secret information needed for execution of the specific processing from the user or another user who is considered to know the secret information on a one-to-one chat and executes the specific processing by using the secret information. This specific processing may be executed only by the chatbot or may be executed by cooperation of the chatbot and an external device (e.g., some sort of output device or server).

As for an example of printing, the methods of the above exemplary embodiment are applicable not only to a case where a file is PW-protected, but also to a case where print data such as a file is printed by using a "security print function". In a printing scheme using the security print function, a combination of any user name and password entered by a print command giver is also transmitted when print data is transmitted from a client to a printer. The printer that has received these pieces of information accumulates therein the print data, the user name, and the password. Then, in a case where the print command giver goes to the printer and gives a command to print the print data by operating an operation panel of the printer, the printer requests entry of the user name and the password associated with the print data. In a case where a user name and a password entered on the operation panel by the user in response to the request matches the user name and the password accumulated in the printer, the printer prints out the print data. In a case where a user (command giver) instructs the chatbot to perform printing using a security print function on a group chat, the chatbot need receive a user name and a password from the command giver and transmit the user name and the password to an output destination printer. In this case, if the command giver notifies the chatbot about the user name and the password in such a manner that the user name and the password are displayed on group chat screens of other users (for example, general posting on a group chat), the other users of the group chat know these pieces of information. The methods of the above exemplary embodiment may be used in order to avoid this. For example, in a case where the chatbot receives a command of security print from a command giver on a group chat, the chatbot inquires a user name and a password from the command giver, for example, on a one-to-one chat and transmit a user name and a password answered by the command giver, for example, on the one-to-one chat in response to this inquiry to an output destination printer. In this example, the user name and the password correspond to "secret information".

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
receive, on a group chat, an execution command to execute specific processing that requires entry of secret information from a first user belonging to the group chat including two or more users;
acquire the secret information from a second user belonging to the group chat without letting a third user belonging to the group chat and different from the second user know the secret information; and
perform control so that the specific processing based on the execution command is executed by using the secret information.

2. The information processing apparatus according to claim 1, wherein
the processor acquires the secret information from the second user by using a communication means by which contents of communication from the second user are not displayed on a screen of the group chat.

3. The information processing apparatus according to claim 2, wherein
the communication means is a one-to-one chat between the second user and the information processing apparatus that is provided by a chat service that offers a place of the group chat.

4. The information processing apparatus according to claim 3, wherein
the processor gives a post requesting entry of the secret information on the one-to-one chat upon receipt of a command to execute processing on the group chat and acquires the secret information from a post of the second user given in response to the post.

5. The information processing apparatus according to claim 4, wherein
in a case where the post given by the second user in response to the post requesting entry of the secret information on the one-to-one chat indicates identification information of a fourth user belonging to the group chat, the processor gives a post requesting entry of the secret information from the fourth user on a one-to-one chat between the fourth user and the information processing apparatus.

6. The information processing apparatus according to claim 1, wherein
the second user is the first user who has posted the execution command on the group chat.

7. The information processing apparatus according to claim 1, wherein
the processor inquires a user who knows the secret information from the first user who has posted the execution command on the group chat and regards a user answered by the first user in response to the inquiry as the second user.

8. The information processing apparatus according to claim 1, wherein
execution of the specific processing requires cancelling a protected state of a target file by using the secret information; and
the processor regards a creator indicated by a creator attribute of the file as the second user.

9. The information processing apparatus according to claim 1, wherein execution of the specific processing requires cancelling a protected state of a target file by using the secret information; and
the processor regards, as the second user, a user who has registered the file in the group chat or in a shared file storage region corresponding to the group chat.

10. The information processing apparatus according to claim 9, wherein
the processor specifies the second user from a history of a post on the group chat when a post indicative of the execution command to execute the specific processing is given on the group chat.

11. The information processing apparatus according to claim 9, wherein
when the file is registered in the group chat or the shared file storage region corresponding to the group chat, the processor acquires the secret information from the second user who has registered the file and stores, in a memory, the acquired secret information or a protection-cancelled file that is the file whose protected state has been cancelled by the secret information; and
the processor performs control so that the specific processing is executed by using the secret information or the protection-cancelled file stored in the memory in response to the execution command.

12. The information processing apparatus according to claim 1, wherein
the processor acquires, from the second user, specifying information for specifying a user among the users belonging to the group chat; and
the processor performs control so that the specific processing is executed in a case where the first user who has given the execution command is the user specified by the specifying information and the specific processing is not executed in a case where the first user is not the user specified by the specifying information.

13. The information processing apparatus according to claim 12, wherein
in a case where the first user who has given the execution command is not the application target user specified by the specifying information, the processor transmits, to the first user, a request requesting entry of the secret information by using a communication means other than the group chat; and
the processor performs control so that the specific processing is executed by using the secret information in a case where the secret information is successfully acquired from the first user by using the communication means in response to the request.

14. The information processing apparatus according to claim 12, wherein
in a case where the first user who has given the execution command is not the application target user specified by the specifying information, the processor inquires, of the second user, whether or not to permit the first user to execute the specific processing; and
in a case where a reply of the second user to the inquiry indicates permission, the processor performs control so that the specific processing is executed.

15. The information processing apparatus according to claim 1, wherein
the specific processing is processing for cancelling an unprintable state of a file by using the secret information and then causing a printer to print the file; and
in a case where the first user who has posted the execution command is a person other than the second user and where an unprintable state of the file is cancelled by using the secret information acquired from the second user concerning the execution command, the processor adds additional data to image data of the file whose unprintable state has been cancelled and causes the printer to print the image data to which the additional data has been added.

16. The information processing apparatus according to claim 1,
    in a case where a user belonging to the group chat performs an operation of registering an unprotected file, the processor converts the file into the protected state and registers, in the group chat, the protected file thus obtained by the conversion, the information processing apparatus further comprising:
    a memory that stores secret information for cancelling the protected state of the protected file obtained by the conversion or the unprotected file,
    wherein in a case where a protected file that is a target of the execution command corresponds to the secret information or the unprotected file stored in the memory, the processor performs control so that the specific processing is executed by using the secret information or the unprotected file.

17. The information processing apparatus according to claim 16, wherein
    in a case where an attribute of a user belonging to the group chat meets a certain condition, the processor posts the unprotected file or file identification information of the file on the group chat without performing the conversion.

18. A non-transitory computer readable medium storing a program causing a computer to:
    receive, on a group chat, an execution command to execute specific processing that requires entry of secret information from a first user belonging to the group chat including two or more users;
    acquire the secret information from a second user belonging to the group chat without letting a third user belonging to the group chat and different from the second user know the secret information; and
    perform control so that the specific processing based on the execution command is executed by using the secret information.

* * * * *